(12) United States Patent
Dhuse et al.

(10) Patent No.: US 10,860,424 B1
(45) Date of Patent: *Dec. 8, 2020

(54) BACKGROUND VERIFICATION PROCESSING IN A STORAGE NETWORK

(71) Applicant: Pure Storage, Inc., Mountain View, CA (US)

(72) Inventors: Greg Dhuse, Chicago, IL (US); Andrew Baptist, Mt. Pleasant, WI (US); Zachary J. Mark, Chicago, IL (US); Jason K. Resch, Chicago, IL (US); Ilya Volvovski, Chicago, IL (US)

(73) Assignee: PURE STORAGE, INC., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/924,708

(22) Filed: Jul. 9, 2020

Related U.S. Application Data

(63) Continuation of application No. 16/535,545, filed on Aug. 8, 2019, which is a continuation of application
(Continued)

(51) Int. Cl.
*G06F 11/00* (2006.01)
*G06F 11/10* (2006.01)
(Continued)

(52) U.S. Cl.
CPC ...... *G06F 11/1092* (2013.01); *G06F 11/1076* (2013.01); *G06F 11/2056* (2013.01); *H04L 67/1097* (2013.01); *H04L 69/40* (2013.01); *G06F 2211/104* (2013.01); *G06F 2211/1028* (2013.01)

(58) Field of Classification Search
CPC ............ G06F 11/08; G06F 2211/1028; G06F 11/1092; G06F 3/0689; G06F 11/1402; G06F 2212/403; G06F 3/0619; G06F 3/067; H04L 69/40; H04L 9/304
See application file for complete search history.

(56) References Cited

U.S. PATENT DOCUMENTS 4,092,732 A   5/1978   Ouchi
5,454,101 A   9/1995   Mackay et al.
(Continued)

OTHER PUBLICATIONS

Chung; an Automatic Data Segmentation Method for 3D Measured Data Points; National Taiwan University; pp. 1-8; 1998.
(Continued)

*Primary Examiner* — Loan L. T. Truong
(74) *Attorney, Agent, or Firm* — Garlick & Markison; Timothy W. Markison; Kelly H. Hale

(57) ABSTRACT

A method for execution by one or more processing modules of a storage network (SN) begins with the one or more processing modules scanning a storage node of the SN at a predetermined interval to determine whether an erasure encoded data slice (EEDS) of a set of erasure encoded data slices (EEDSs) is corrupt, where the set of erasure encoded data slices (EEDSs) is generated from object data using an erasure error encoding dispersal function. The method continues with the one or more processing modules determining that an EEDS is corrupt and in response, rebuilding the EEDS in place in the storage node.

20 Claims, 28 Drawing Sheets

Related U.S. Application Data

No. 15/612,243, filed on Jun. 2, 2017, now Pat. No. 10,387,256, which is a continuation of application No. 14/331,997, filed on Jul. 15, 2014, now Pat. No. 9,785,503, which is a continuation of application No. 14/047,661, filed on Oct. 7, 2013, now Pat. No. 8,819,482, and a continuation-in-part of application No. 13/863,475, filed on Apr. 16, 2013, now Pat. No. 9,092,140, which is a continuation of application No. 12/797,025, filed on Jun. 9, 2010, now Pat. No. 8,595,435, said application No. 14/047,661 is a continuation of application No. 12/767,364, filed on Apr. 26, 2010, now Pat. No. 8,555,109, which is a continuation-in-part of application No. 12/716,106, filed on Mar. 2, 2010, now Pat. No. 8,560,882, said application No. 13/863,475 is a continuation-in-part of application No. 12/080,042, filed on Mar. 31, 2008, now Pat. No. 8,880,799, which is a continuation-in-part of application No. 11/973,542, filed on Oct. 9, 2007, now Pat. No. 9,996,413, and a continuation-in-part of application No. 11/403,391, filed on Apr. 13, 2006, now Pat. No. 7,546,427, which is a continuation-in-part of application No. 11/241,555, filed on Sep. 30, 2005, now Pat. No. 7,953,937.

(60) Provisional application No. 61/230,038, filed on Jul. 30, 2009, provisional application No. 61/230,034, filed on Jul. 20, 2009.

(51) Int. Cl.
*H04L 29/08* (2006.01)
*G06F 11/20* (2006.01)
*H04L 29/14* (2006.01)

(56) References Cited

U.S. PATENT DOCUMENTS

| | | | |
|---|---|---|---|
| 5,485,474 A * | 1/1996 | Rabin | G06F 11/004 714/762 |
| 5,774,643 A | 6/1998 | Lubbers et al. | |
| 5,802,364 A | 9/1998 | Senator et al. | |
| 5,809,285 A | 9/1998 | Hilland | |
| 5,835,940 A | 11/1998 | Yorimitsu et al. | |
| 5,890,156 A | 3/1999 | Rekieta et al. | |
| 5,987,622 A | 11/1999 | Lo Verso et al. | |
| 5,991,414 A | 11/1999 | Garay et al. | |
| 6,012,159 A | 1/2000 | Fischer et al. | |
| 6,058,454 A | 5/2000 | Gerlach et al. | |
| 6,092,215 A | 7/2000 | Hodges et al. | |
| 6,128,277 A | 10/2000 | Bruck et al. | |
| 6,175,571 B1 | 1/2001 | Haddock et al. | |
| 6,192,472 B1 | 2/2001 | Garay et al. | |
| 6,256,688 B1 | 7/2001 | Suetaka et al. | |
| 6,272,658 B1 | 8/2001 | Steele et al. | |
| 6,301,604 B1 | 10/2001 | Nojima | |
| 6,356,949 B1 | 3/2002 | Katsandres et al. | |
| 6,366,995 B1 | 4/2002 | Vilkov et al. | |
| 6,374,336 B1 | 4/2002 | Peters et al. | |
| 6,415,373 B1 | 7/2002 | Peters et al. | |
| 6,418,539 B1 | 7/2002 | Walker | |
| 6,446,237 B1 | 9/2002 | Menon | |
| 6,449,688 B1 | 9/2002 | Peters et al. | |
| 6,516,425 B1 | 2/2003 | Belhadj et al. | |
| 6,567,948 B2 | 5/2003 | Steele et al. | |
| 6,571,282 B1 | 5/2003 | Bowman-Amuah | |
| 6,571,351 B1 | 5/2003 | Mitaru et al. | |
| 6,609,223 B1 | 8/2003 | Wolfgang | |
| 6,647,514 B1 | 11/2003 | Umberger et al. | |
| 6,675,318 B1 | 1/2004 | Lee | |
| 6,718,361 B1 | 4/2004 | Basani et al. | |
| 6,742,081 B2 | 5/2004 | Talagala et al. | |
| 6,760,808 B2 | 7/2004 | Peters et al. | |
| 6,785,768 B2 | 8/2004 | Peters et al. | |
| 6,785,783 B2 | 8/2004 | Buckland | |
| 6,826,711 B2 | 11/2004 | Moulton et al. | |
| 6,842,422 B1 | 1/2005 | Bianchini, Jr. | |
| 6,879,596 B1 | 4/2005 | Dooply | |
| 6,895,469 B2 | 5/2005 | Tomita | |
| 6,912,614 B2 | 6/2005 | Tomita | |
| 6,959,413 B2 | 10/2005 | Humlicek et al. | |
| 6,981,171 B2 | 12/2005 | Hashemi | |
| 7,003,688 B1 | 2/2006 | Pittelkow et al. | |
| 7,024,451 B2 | 4/2006 | Jorgenson | |
| 7,024,609 B2 | 4/2006 | Wolfgang et al. | |
| 7,080,101 B1 | 7/2006 | Watson et al. | |
| 7,103,824 B2 | 9/2006 | Halford | |
| 7,103,915 B2 | 9/2006 | Redlich et al. | |
| 7,111,115 B2 | 9/2006 | Peters et al. | |
| 7,140,044 B2 | 11/2006 | Redlich et al. | |
| 7,146,461 B1 | 12/2006 | Kiselev et al. | |
| 7,146,644 B2 | 12/2006 | Redlich et al. | |
| 7,171,493 B2 | 1/2007 | Shu et al. | |
| 7,222,133 B1 | 5/2007 | Raipurkar et al. | |
| 7,240,236 B2 | 7/2007 | Cutts et al. | |
| 7,272,613 B2 | 9/2007 | Sim et al. | |
| 7,308,599 B2 | 12/2007 | Patterson | |
| 7,546,427 B2 * | 6/2009 | Gladwin | G06F 11/1076 711/154 |
| 7,636,724 B2 | 12/2009 | de la Torre et al. | |
| 7,810,145 B2 | 10/2010 | Lehinger et al. | |
| 7,953,937 B2 | 5/2011 | Gladwin et al. | |
| 8,001,417 B2 | 8/2011 | Byrne et al. | |
| 8,209,363 B2 | 6/2012 | Palthepu et al. | |
| 8,352,782 B2 | 1/2013 | Thornton et al. | |
| 8,464,096 B2 | 6/2013 | Thornton et al. | |
| 8,489,915 B2 * | 7/2013 | Dhuse | H04L 67/1097 714/6.22 |
| 8,538,028 B2 | 9/2013 | Yeap et al. | |
| 8,555,109 B2 | 10/2013 | Dhuse et al. | |
| 8,560,882 B2 | 10/2013 | Thornton et al. | |
| 8,615,039 B2 | 12/2013 | Lee et al. | |
| 8,706,980 B2 * | 4/2014 | Dhuse | G06F 11/1092 711/156 |
| 8,819,482 B2 | 8/2014 | Dhuse et al. | |
| 8,972,774 B2 | 3/2015 | Grube et al. | |
| 9,274,977 B2 | 3/2016 | Resch | |
| 9,785,503 B2 | 10/2017 | Dhuse et al. | |
| 10,108,492 B2 | 10/2018 | Dhuse et al. | |
| 2002/0062422 A1 | 5/2002 | Butterworth et al. | |
| 2002/0166079 A1 | 11/2002 | Ulrich et al. | |
| 2003/0018927 A1 | 1/2003 | Gadir et al. | |
| 2003/0037261 A1 | 2/2003 | Meffert et al. | |
| 2003/0065617 A1 | 4/2003 | Watkins et al. | |
| 2003/0084020 A1 | 5/2003 | Shu | |
| 2003/0120723 A1 | 6/2003 | Bright et al. | |
| 2003/0123603 A1 | 7/2003 | Suzuki | |
| 2004/0024963 A1 | 2/2004 | Talagala et al. | |
| 2004/0122917 A1 | 6/2004 | Menon et al. | |
| 2004/0128442 A1 | 7/2004 | Hinshaw et al. | |
| 2004/0215998 A1 | 10/2004 | Buxton et al. | |
| 2004/0228493 A1 | 11/2004 | Ma | |
| 2005/0100022 A1 | 5/2005 | Ramprashad | |
| 2005/0114594 A1 | 5/2005 | Corbett et al. | |
| 2005/0125593 A1 | 6/2005 | Karpoff et al. | |
| 2005/0131993 A1 | 6/2005 | Fatula | |
| 2005/0132070 A1 | 6/2005 | Redlich et al. | |
| 2005/0144382 A1 | 6/2005 | Schmisseur | |
| 2005/0229069 A1 | 10/2005 | Hassner et al. | |
| 2006/0041782 A1 | 2/2006 | Ali et al. | |
| 2006/0047907 A1 | 3/2006 | Shiga et al. | |
| 2006/0136448 A1 | 6/2006 | Cialini et al. | |
| 2006/0156059 A1 | 7/2006 | Kitamura | |
| 2006/0161805 A1 | 7/2006 | Tseng et al. | |
| 2006/0218433 A1 | 9/2006 | Williams | |
| 2006/0224603 A1 | 10/2006 | Correll | |
| 2006/0233239 A1 | 10/2006 | Sethi et al. | |
| 2007/0079081 A1 | 4/2007 | Gladwin et al. | |
| 2007/0079082 A1 * | 4/2007 | Gladwin | G06F 11/1076 711/154 |

(56) References Cited

U.S. PATENT DOCUMENTS

| | | | |
|---|---|---|---|
| 2007/0079083 A1* | 4/2007 | Gladwin | G06F 21/6227 711/154 |
| 2007/0088970 A1 | 4/2007 | Buxton et al. | |
| 2007/0174192 A1 | 7/2007 | Gladwin et al. | |
| 2007/0174682 A1 | 7/2007 | King | |
| 2007/0205268 A1 | 9/2007 | Yamasaki | |
| 2007/0214285 A1 | 9/2007 | Au et al. | |
| 2007/0234110 A1 | 10/2007 | Soran et al. | |
| 2007/0283167 A1 | 12/2007 | Venters et al. | |
| 2008/0002777 A1 | 1/2008 | Hwang et al. | |
| 2008/0120361 A1 | 5/2008 | Pagan | |
| 2008/0183975 A1 | 7/2008 | Foster et al. | |
| 2008/0250270 A1 | 10/2008 | Bennett | |
| 2009/0094251 A1 | 4/2009 | Gladwin et al. | |
| 2009/0094318 A1 | 4/2009 | Gladwin et al. | |
| 2009/0178144 A1 | 7/2009 | Redlich et al. | |
| 2009/0182939 A1 | 7/2009 | Hluchyj et al. | |
| 2009/0194585 A1 | 8/2009 | Blackson et al. | |
| 2010/0023524 A1 | 1/2010 | Gladwin et al. | |
| 2010/0031082 A1 | 2/2010 | Olster | |
| 2010/0161916 A1 | 6/2010 | Thornton et al. | |
| 2011/0029711 A1 | 2/2011 | Dhuse et al. | |
| 2011/0029809 A1 | 2/2011 | Dhuse et al. | |
| 2011/0029836 A1* | 2/2011 | Dhuse | G06F 11/08 714/752 |
| 2011/0126060 A1 | 5/2011 | Grube et al. | |
| 2012/0290873 A1 | 11/2012 | Thornton et al. | |
| 2014/0351659 A1 | 11/2014 | Dhuse et al. | |
| 2015/0355979 A1* | 12/2015 | Volvovski | G06F 11/2094 707/675 |
| 2017/0153947 A1* | 6/2017 | Baptist | G06F 3/061 |
| 2017/0300374 A1 | 10/2017 | Gladwin et al. | |
| 2019/0068709 A1 | 2/2019 | McShane et al. | |

OTHER PUBLICATIONS

European Patent Office; Extended European Search Report; Ep 10804922; 15 Sept 2017; 8 pgs.
Harrison; Lightweight Directory Access Protocol (LDAP): Authentication Methods and Security Mechanisms; IETF getwork Working Group; Rfc 4513; Jun. 2006; pp. 1-32.
International Search Report and Written Opinion; International Application No. PCT/US10/43178; 04 Nov. 2010; 3 pages.
Kubiatowicz, et al.; OceanStore: An Architecture for Global-Scale Persistent Storage; Proceedings of the Ninth ntemational Conference on Architectural Support for Programming Languages and Operating Systems (Asplos 2000); Nov. 2000; pp. 1-12.
Legg; Lightweight Directory Access Protocol (LDAP): Syntaxes and Matching Rules; IETF Network Working Group; RFC 4517; Jun. 2006; pp. 1-50.
Plank, T1: Erasure Codes for Storage Applications; FAST2005, 4th Usenix Conference on File Storage Technologies; Dec. 13-16, 2005; pp. 1-74.
Rabin; Efficient Dispersal of Information for Security, Load Balancing, and Fault Tolerance; Journal of the Association 'Or Computer Machinery; vol. 36, No. 2; Apr. 1989; pp. 335-348.
Satran, et al.; Internet Small Computer Systems Interface (iSCSI); Ietf Network Working Group; Rfc 3720; Apr. 2004; pp. 1-257.
Sciberras; Lightweight Directory Access Protocol (Ldap): Schema for User Applications; Ietf Network Working Group; Rfc 4519; Jun. 2006; pp. 1-33.
Sermersheim; Lightweight Directory Access Protocol (Ldap): the Protocol; Ietf Network Working Group; Rfc 4511; Jun. 2006; pp. 1-68.
Shamir; How to Share a Secret; Communications of the Acm; vol. 22, No. 11; Nov. 1979; pp. 612-613.
Smith; Lightweight Directory Access Protocol (Ldap): String Representation of Search Filters; Ietf Network Working Group; Rfc 4515; Jun. 2006; pp. 1-12.
Smith; Lightweight Directory Access Protocol (Ldap): Uniform Resource Locator; Ietf Network Working Group; Rfc 4516; Jun. 2006; pp. 1-15.
Wildi; Java iSCSi Initiator; Master Thesis; Department of Computer and Information Science, University of Konstanz; Feb. 2007; 60 pgs.
Xin, et al.; Evaluation of Distributed Recovery in Large-Scale Storage Systems; 13th IEEE International Symposium pn High Performance Distributed Computing; Jun. 2004; pp_ 172-181.
Zeilenga; Lightweight Directory Access Protocol (LDAP): Technical Specification Road Map; IETF Network Working 3-Group; RFC 4510; Jun. 2006; pp. 1-8.
Zeilenga; Lightweight Directory Access Protocol (LDAP): Directory Information Models; Ietf Network Working 3- Group; RFC 4512; Jun. 2006; pp. 1-49.
Zeilenga; Lightweight Directory Access Protocol (LDAP): Internationalized String Preparation; IETF Network Working Group; RFC 4518; Jun. 2006; pp. 1-14.
Zeilenga; Lightweight Directory Access Protocol (LDAP): String Representation of Distinguished Names; IETF Network Working Group; RFC 4514; Jun. 2006; pp. 1-15.

\* cited by examiner

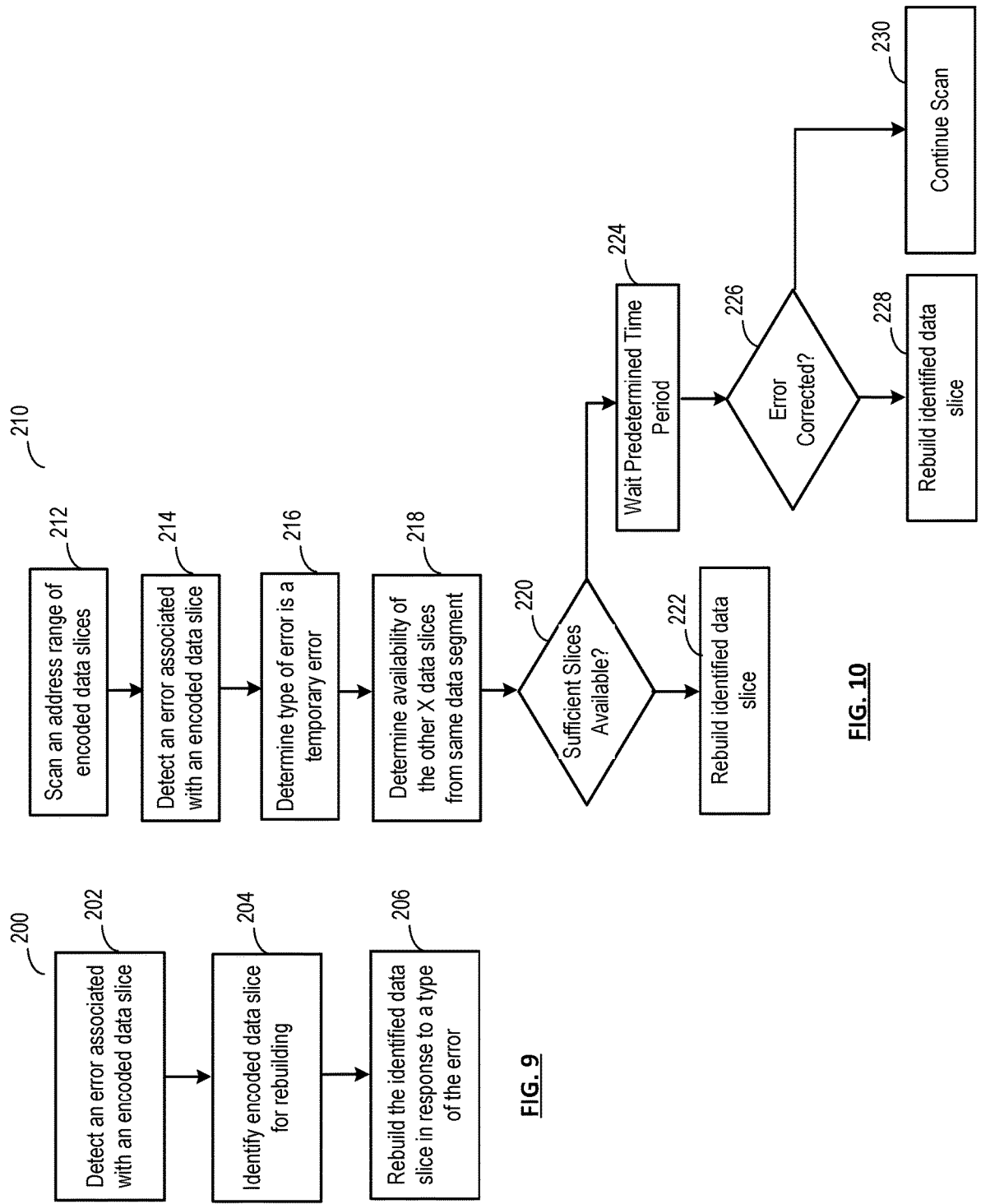

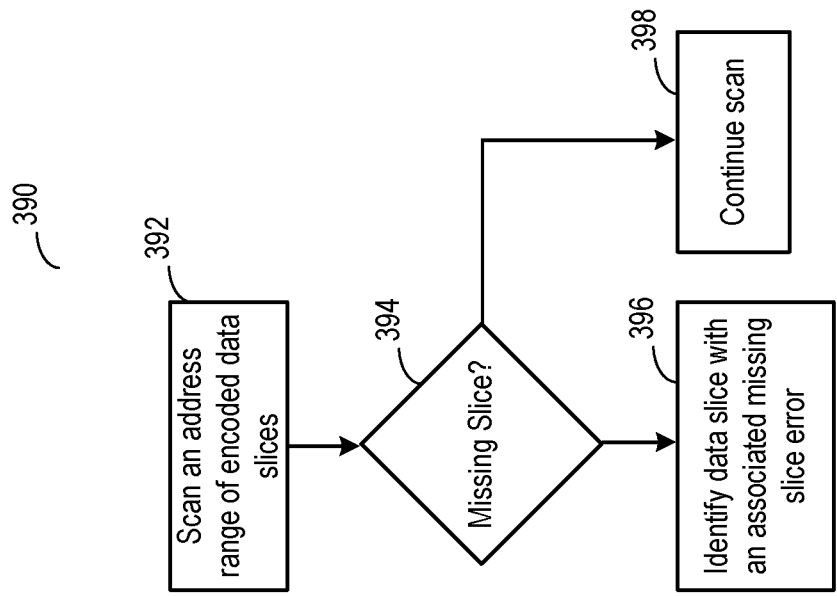
FIG. 17
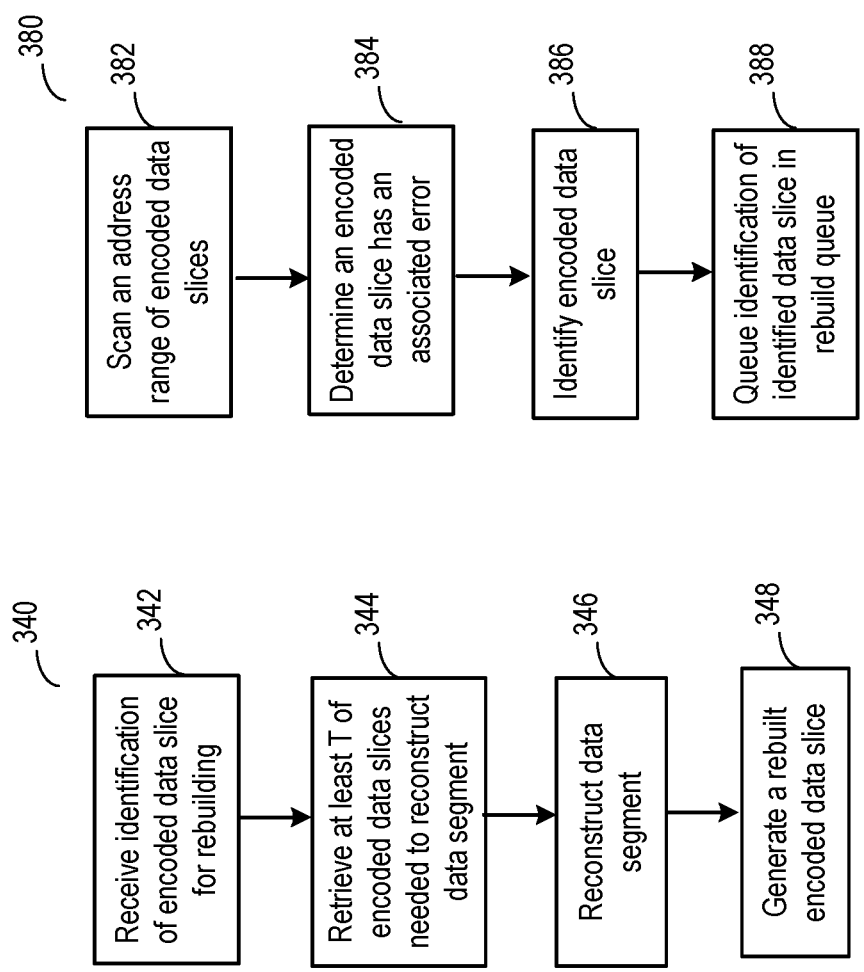
FIG. 16
FIG. 14

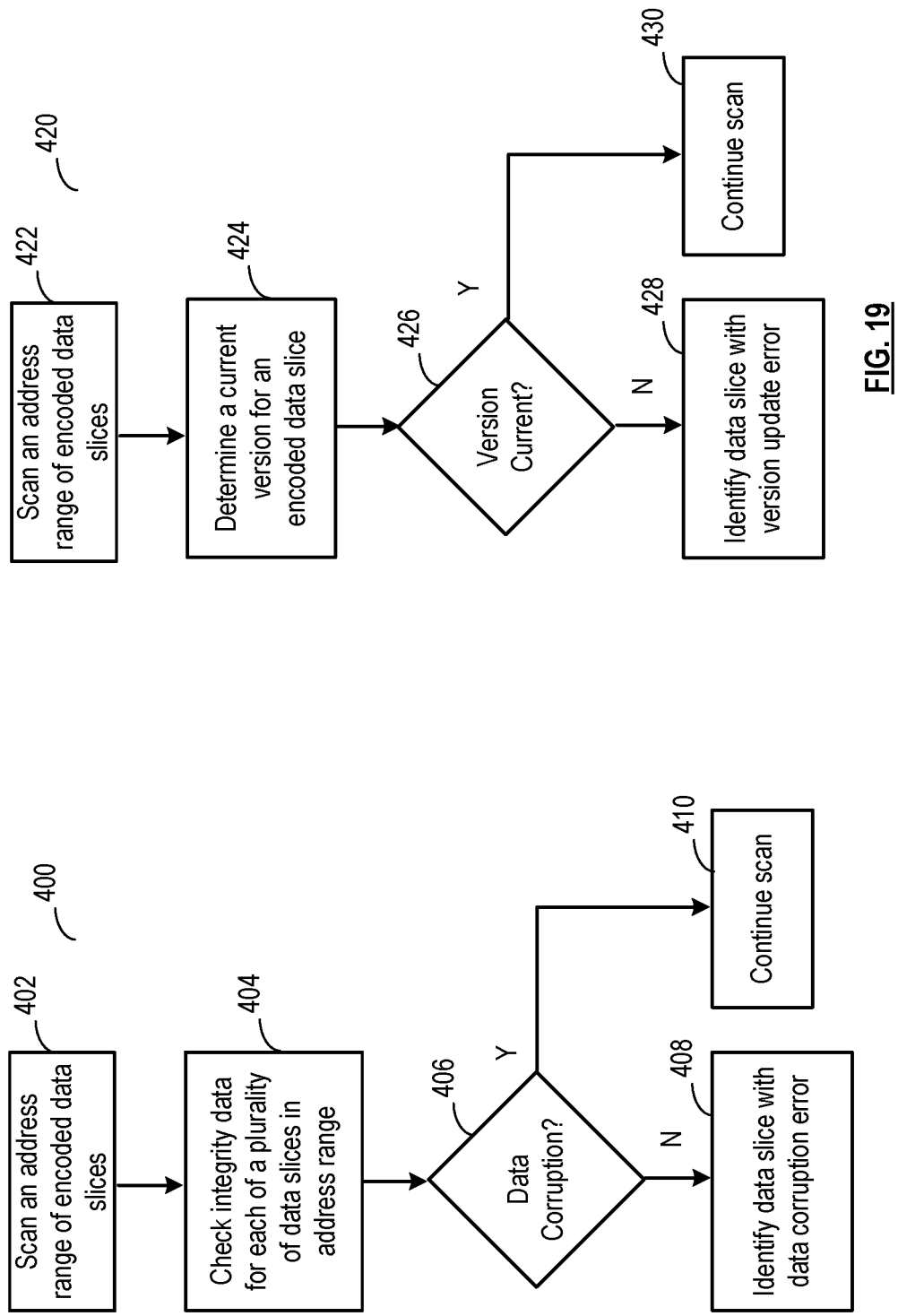

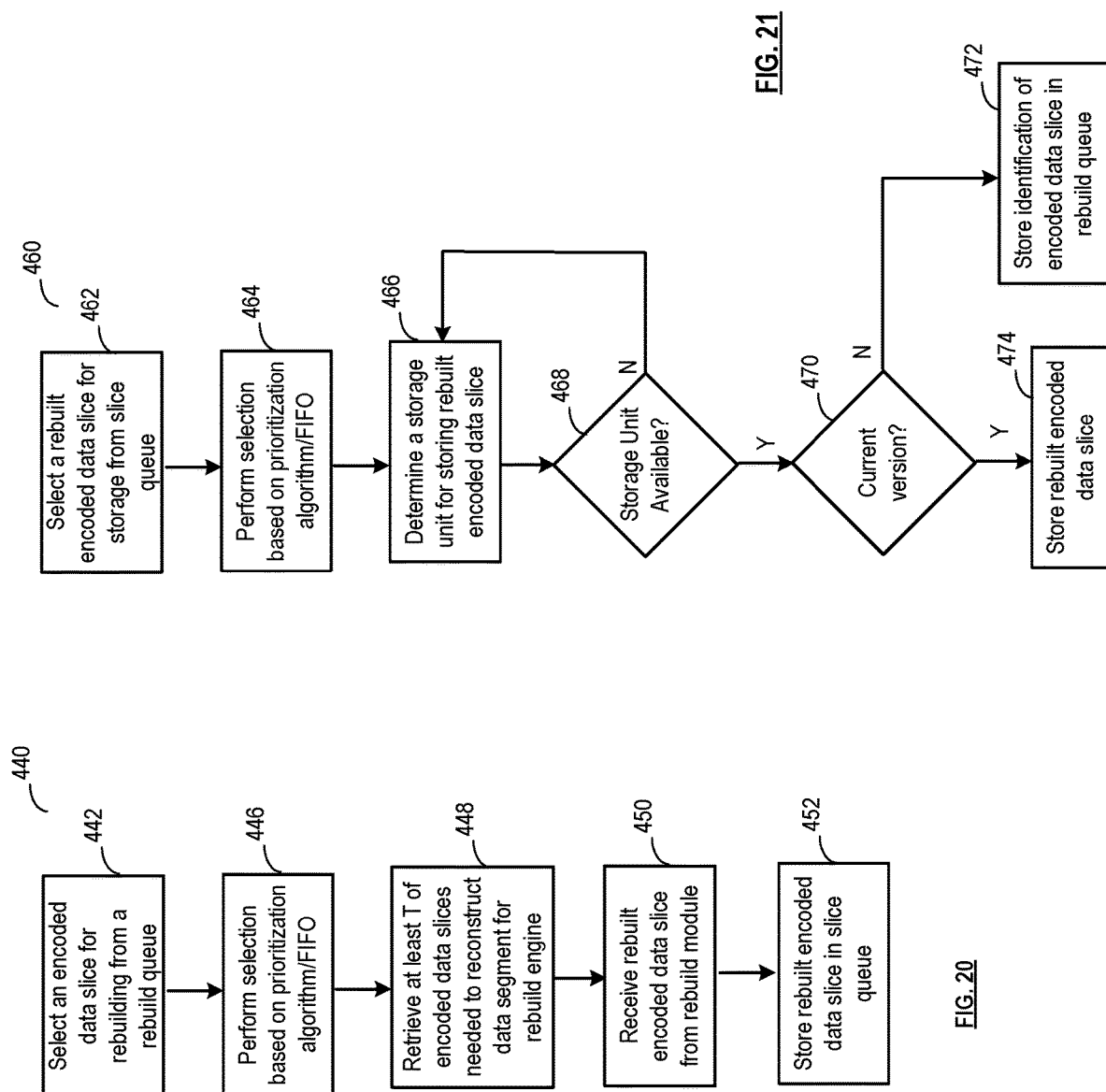

| Vault λ Address Ranges | Pillar 0 | Pillar 1 | Pillar 2 | Pillar 3 | Pillar 4 | Pillar 5 | Assigned Scanning Storage unit | Scanning assignment |
|---|---|---|---|---|---|---|---|---|
| range 0 | | B | | | F | | A | A,B,D,E,F,H |
| range 1 | A | | D | E | | H | B | A,B,D,E,G,H |
| range 2 | | | | | | | C | A,C,D,E,G,H |
| range 3 | | C | | | G | | D | A,C,D,L,G,H |
| range 4 | | | | L | | | L | A,C,D,L,G,H |
| range 5 | J | | | | | I | G | J,C,D,L,G,I |
| range 6 | | | K | | M | | J | J,C,K,L,G,I |
| range 7 | | | | | | | K | J,C,K,L,M,I |
| range 8 | | | | | | | M | J,C,K,L,M,I |

FIG. 24

BACKGROUND VERIFICATION PROCESSING IN A STORAGE NETWORK

CROSS-REFERENCE TO RELATED PATENTS

The present U.S. Utility Patent Application claims priority pursuant to 35 U.S.C. § 120 as a continuation of U.S. Utility application Ser. No. 16/535,545, entitled "Integrity Processing in a Dispersed Storage Network", filed Aug. 8, 2019, which is a continuation of U.S. Utility application Ser. No. 15/612,243, entitled "Method And Apparatus For Distributed Storage Integrity Processing", filed Jun. 2, 2017, issued as U.S. Pat. No. 10,387,256 on Aug. 20, 2019, which is a continuation of U.S. Utility application Ser. No. 14/331,997, entitled "Method And Apparatus For Distributed Storage Integrity Processing", filed Jul. 15, 2014, issued as U.S. Pat. No. 9,785,503 on Oct. 10, 2017, which is a continuation of U.S. Utility application Ser. No. 14/047,661, entitled "Method And Apparatus For Distributed Storage Integrity Processing", filed Oct. 7, 2013, issued as U.S. Pat. No. 8,819,482 on Aug. 26, 2014, which is a continuation of U.S. Utility application Ser. No. 12/767,364, entitled "Method And Apparatus For Distributed Storage Integrity Processing", filed Apr. 26, 2010, issued as U.S. Pat. No. 8,555,109 on Oct. 8, 2013, all of which are hereby incorporated herein by reference in their entirety and made part of the present U.S. Utility Patent Application for all purposes.

U.S. Utility application Ser. No. 12/767,364 also claims priority under 35 U.S.C. § 120 as a continuation-in-part application to U.S. Utility application Ser. No. 12/716,106, entitled "Method And Apparatus For Rebuilding Data In A Dispersed Data Storage Network," filed Mar. 2, 2010, issued as U.S. Pat. No. 8,560,882 on Oct. 15, 2013.

U.S. Utility application Ser. No. 12/767,364 also claims priority under 35 U.S.C. § 119(e) to U.S. Provisional Application No. 61/230,034, entitled "Dispersed Storage Network Data Rebuilding," filed Jul. 30, 2009.

U.S. Utility patent application Ser. No. 14/331,997 also claims priority pursuant to 35 U.S.C. § 120 as a continuation-in-part of U.S. Utility application Ser. No. 13/863,475, entitled "Dispersed Storage Write Process," filed Apr. 16, 2013, issued as U.S. Pat. No. 9,092,140 on Jul. 28, 2015, which is a continuation of U.S. Utility application Ser. No. 12/797,025, entitled "Dispersed Storage Write Process," filed Jun. 9, 2010, issued as U.S. Pat. No. 8,595,435 on Nov. 26, 2013, which claims priority pursuant to 35 U.S.C. § 119(e) to U.S. Provisional Application No. 61/230,038, entitled "Dispersed Storage Network Version Synchronization," filed Jul. 30, 2009.

U.S. Utility application Ser. No. 13/863,475 also claims priority pursuant to 35 U.S.C. § 120 as a continuation-in-part of U.S. Utility application Ser. No. 12/080,042, entitled, "Rebuilding Data On A Dispersed Storage Network," filed Mar. 31, 2008, issued as U.S. Pat. No. 8,880,799 on Nov. 4, 2014, which is a continuation-in-part of U.S. Utility application Ser. No. 11/973,542, entitled "Ensuring Data Integrity On A Dispersed Storage Grid," filed Oct. 9, 2007, issued as U.S. Pat. No. 9,996,413 on Jun. 12, 2018; and is a continuation-in-part of U.S. Utility application Ser. No. 11/403,391, entitled "System For Rebuilding Dispersed Data," filed Apr. 13, 2006, issued as U.S. Pat. No. 7,546,427 on Jun. 9, 2009, which is a continuation-in-part of U.S. Utility application Ser. No. 11/241,555, entitled "Systems, Methods, And Apparatus For Subdividing Data For Storage In A Dispersed Data Storage Grid," filed Sep. 30, 2005, issued as U.S. Pat. No. 7,953,937 on May 31, 2011.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

Technical Field of the Invention

This invention relates generally to computing systems and more particularly to data storage within such computing systems.

Description of Related Art

Computing systems are known to communicate, process, and store data. Such computing systems range from wireless smart phones to data centers that support millions of web searches, stock trades, or on-line purchases every day. Computing processing is known to manipulate data from one form into another. For instance, raw picture data from an image sensor may be compressed and/or manipulated in accordance with a picture compression standard to produce a standardized compressed picture that can be saved or shared with others.

With continued advances in computing processing speed and communication speed, computers manipulate real time media from voice to streaming high definition video. As such, general-purpose information appliances are replacing purpose-built communications devices (e.g., a telephone). For example, smart phones can support telephony communications but they are also capable of text messaging and accessing the internet to perform functions including email, web browsing, remote applications access, and media communications (e.g., telephony voice, image transfer, music files, video files, real time video streaming. etc.).

Each type of computing system is constructed, and hence operates, in accordance with one or more communication, processing, and storage standards. As a result of standardization and with advances in technology, more and more information content is being converted into digital formats. For example, more digital cameras are now being sold than film cameras, thus producing more digital pictures. As another example, web-based programming is becoming an alternative to over the air television broadcasts and/or cable broadcasts. As further examples, papers, books, video entertainment, home video, etc. are now being stored digitally which increases the demand on the storage function of computing systems.

A typical computer storage function includes one or more memory devices aligned with the needs of the various operational aspects of the computer system's processing and communication functions. Generally, the immediacy of access dictates what type of memory device is used. For example, random access memory (RAM) memory can be accessed in any random order with a constant response time, thus it is typically used for cache memory and main memory. By contrast, memory device technologies that require physical movement such as magnetic disks, tapes, and optical discs, have a variable response time as the physical movement can take longer than the data transfer, thus are typically used for secondary memory (e.g., hard drive, backup memory, etc.).

Computer system storage standards include, but are not limited to, network file system (NFS), flash file system (FFS), disk file system (DFS), small computer system interface (SCSI), internet small computer system interface (iSCSI), file transfer protocol (FTP), and web-based distributed authoring and versioning (WebDAV). Such standards specify the data storage format (e.g., files, data objects, data blocks, directories, etc.) and interface between the computer system's processing function and the memory devices. Typically a memory controller provides the interface function between the processing function and the memory devices and will have to change as new storage systems are developed.

Despite the standardization of the computer system and its memory, memory devices fail; especially commercial grade memory devices that utilize technologies incorporating physical movement (e.g., a disc drive). For example, it is fairly common for a disc drive to routinely suffer from bit level corruption and to completely fail after three years of use. One solution is to a higher-grade disc drive, which adds significant cost to the computing system.

Another solution is to utilize multiple levels of redundant disc drives to replicate the data into two or more copies. One such redundant drive approach is called redundant array of independent discs (RAID). In a RAID device, a RAID controller adds parity data to the original data before storing it across the array. The parity data is calculated from the original data such that the failure of one or more discs will not result in the loss of the original data. For example, RAID 5 uses three discs to protect data from the failure of a single disc. The parity data, and associated redundancy overhead data, reduces the storage capacity of three independent discs by one third (e.g., n−1=capacity). RAID 6 can recover from a loss of two discs and requires a minimum of four discs with a storage capacity of n−2.

While RAID addresses the memory device failure issue, it is not without its own failures issues that affect its effectiveness, efficiency and security. For instance, as more discs are added to the array, the probability of a disc failure increases, which increases the demand for maintenance. For example, when a disc fails, it needs to be manually replaced before another disc fails and the data stored in the RAID device is lost. To reduce the risk of data loss, data on a RAID device is typically copied on to one or more other RAID devices. While this addresses the loss of data issue, it raises a security issue since multiple copies of data are available, which increases the chances of unauthorized access. Further, as the amount of data being stored grows, the overhead of RAID devices becomes a non-trivial efficiency issue.

Therefore, a need exists for a data storage solution that provides more reliable storage of data, minimizes adverse affects of multiple memory elements failures, provides improved security, is adaptable to a wide variety of storage system standards, and/or is compatible with computing and communications systems.

BRIEF DESCRIPTION OF THE SEVERAL VIEWS OF THE DRAWINGS

FIG. 9 is a logic flow diagram of an embodiment of a method for data rebuilding in accordance with the present invention;

FIG. 10 is a logic flow diagram of another embodiment of a method for data rebuilding in accordance with the present invention;

FIG. 14 is a logic flow diagram of another embodiment for data rebuilding in accordance with the present invention;

FIG. 16 is a logic flow diagram of an embodiment of a method for scanning in accordance with the present invention;

FIG. 17 is a logic flow diagram of another embodiment of a method for scanning in accordance with the present invention;

FIG. 18 is a logic flow diagram of another embodiment of a method for scanning in accordance with the present invention;

FIG. 19 is a logic flow diagram of another embodiment of a method for scanning in accordance with the present invention;

FIG. 20 is a logic flow diagram of another embodiment for data rebuilding in accordance with the present invention;

FIG. 21 is a logic flow diagram of another embodiment for data rebuilding in accordance with the present invention;

FIG. 24 is a diagram of an embodiment of a distributed storage memory mapping in accordance with the invention;

DETAILED DESCRIPTION OF THE INVENTION

Figure 1:
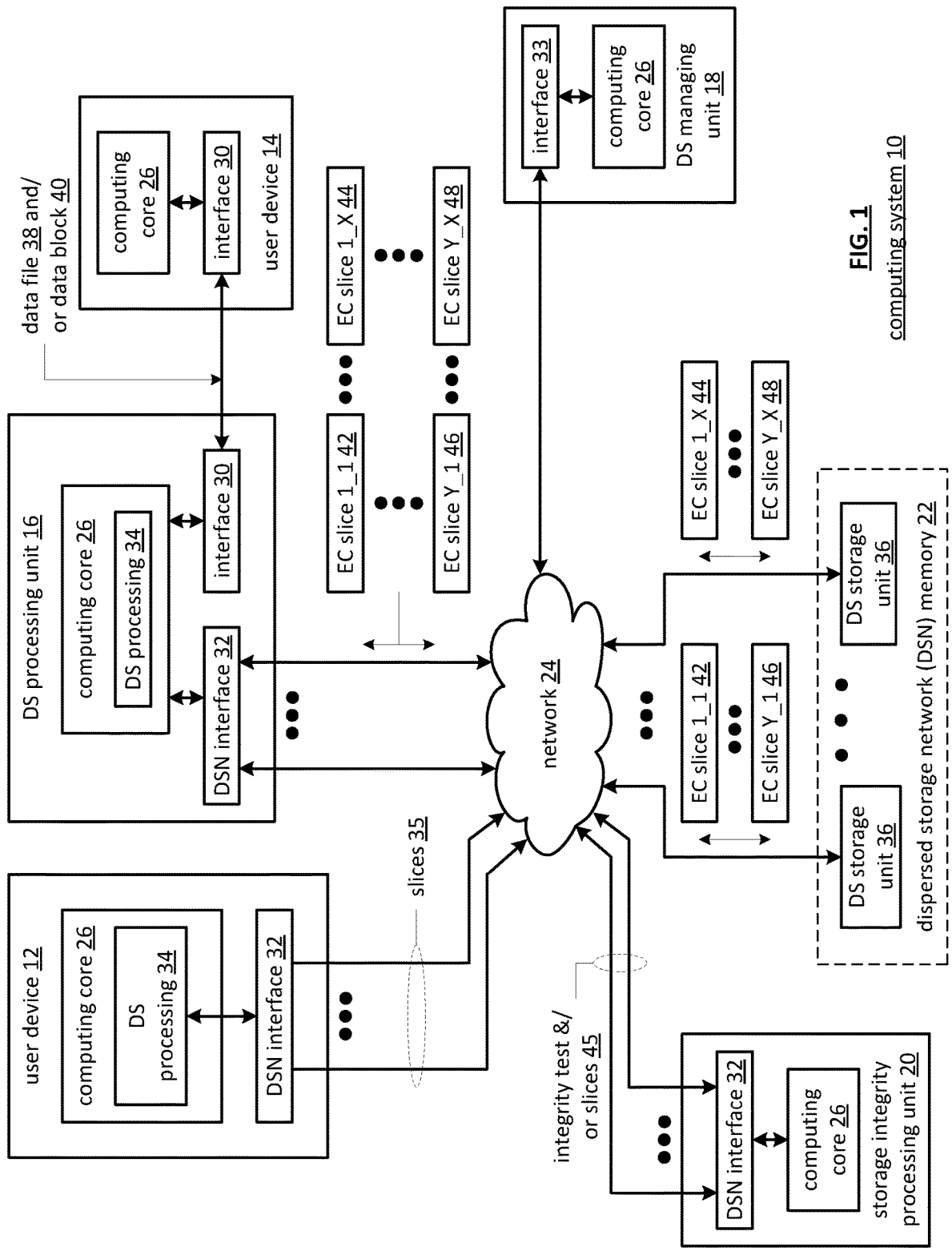
FIG. 1 is a schematic block diagram of an embodiment of a computing system for dispersed storage in accordance with the invention.

FIG. 1 is a schematic block diagram of a computing system 10 for dispersed storage that includes one or more of a first type of user devices 12, one or more of a second type of user device 14, at least one distributed storage (DS) processing unit 16, at least one DS managing unit 18, at least one storage integrity processing unit 20, and a distributed storage network (DSN) memory 22 coupled via a network 24. The network 24 may include one or more wireless and/or wire lined communication systems; one or more private intranet systems and/or public internet systems; and/or one or more local area networks (LAN) and/or wide area networks (WAN).

The DSN memory 22 includes a plurality of DS storage units 36 for storing data of in the computing system 10. Each of the DS storage units 36 includes a processing module and memory and may be located at geographically different sites (e.g., one in Chicago, one in Milwaukee, etc.). The processing module may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module may have an associated memory and/or memory element, which may be a single memory device, a plurality of memory devices, and/or embedded circuitry of the processing module. Such a memory device may be a read-only memory, random access memory, volatile memory, non-volatile memory, static memory, dynamic memory, flash memory, cache memory, and/or any device that stores digital information. Note that if the processing module includes more than one processing device, the processing devices may be centrally located (e.g., directly coupled together via a wired and/or wireless bus structure) or may be distributedly located (e.g., cloud computing via indirect coupling via a local area network and/or a wide area network). Further note that when the processing module implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element stores, and the processing module executes, hard coded and/or operational instructions corresponding to at least some of the steps and/or functions illustrated in FIGS. 1-24.

Each of the user devices 12, 14, the DS processing unit 16, the DS managing unit 18, and the storage integrity processing unit 20 may be a portable computing device (e.g., a social networking device, a gaming device, a cell phone, a smart phone, a personal digital assistant, a digital music player, a digital video player, a laptop computer, a handheld computer, a video game controller, and/or any other portable device that includes a computing core) and/or a fixed computing device (e.g., a personal computer, a computer server, a cable set-top box, a satellite receiver, a television set, a printer, a fax machine, home entertainment equipment, a video game console, and/or any type of home or office computing equipment). Such a portable or fixed computing device includes a computing core 26 and one or more interfaces 30, 32, and/or 33. An embodiment of the computing core 26 will be described with reference to FIG. 2.

With respect to the interfaces, each of the interfaces 30, 32, and 33 includes software and/or hardware to support one or more communication links via the network 24 and/or directly. For example, interfaces 30 support a communication link (wired, wireless, direct, via a LAN, via the network 24, etc.) between the first type of user device 14 and the DS processing unit 16. As another example, DSN interface 32 supports a plurality of communication links via the network 24 between the DSN memory 22 and the DS processing unit 16, the first type of user device 12, and/or the storage integrity processing unit 20. As yet another example, interface 33 supports a communication link between the DS managing unit 18 and any one of the other devices and/or units 12, 14, 16, 20, and/or 22 via the network 24.

In general, the computing system 10 supports three primary functions: distributed network data storage management, distributed data storage and retrieval, and data storage integrity verification. In accordance with these three primary functions, data can be distributedly stored in a plurality of physically different locations and subsequently retrieved in a reliable and secure manner despite failures of individual storage devices, failures of network equipment, the duration of storage, the amount of data being stored, unauthorized attempts to access the data, etc.

The DS managing unit 18 performs the distributed network data storage management functions, which include establishing distributed data storage parameters, performing network operations, performing network administration, and/or performing network maintenance. The DS managing unit 18 establishes the distributed data storage parameters (e.g., allocation of virtual DSN memory space, distributed storage parameters, security parameters, billing information, user profile information, etc.) for one or more of the user devices 12-14 (e.g., established for individual devices, established for a user group of devices, established for public access by the user devices, etc.). For example, the DS managing unit 18 coordinates the creation of a vault (e.g., a virtual memory block) within the DSN memory 22 for a user device (for a group of devices, or for public access). The DS managing unit 18 also determines the distributed data storage parameters for the vault. In particular, the DS managing unit 18 determines a number of slices (e.g., the number that a data segment of a data file and/or data block is partitioned into for distributed storage) and a threshold value (e.g., the minimum number of slices required to reconstruct the data segment).

As another example, the DS managing module 18 may create and store locally or within the DSN memory 22 user profile information. The user profile information includes one or more of authentication information, permissions, and/or the security parameters. The security parameters may include one or more of encryption/decryption scheme, one or more encryption keys, key generation scheme, and data encoding/decoding scheme.

As yet another example, the DS managing unit 18 may create billing information for a particular user, user group, vault access, public vault access, etc. For instance, the DS managing unit 18 may track the number of times user accesses a private vault and/or public vaults, which can be used to generate a per-access bill. In another instance, the DS managing unit 18 tracks the amount of data stored and/or retrieved by a user device and/or a user group, which can be used to generate a per-data-amount bill.

The DS managing unit 18 also performs network operations, network administration, and/or network maintenance. As at least part of performing the network operations and/or administration, the DS managing unit 18 monitors performance of the devices and/or units of the system 10 for potential failures, determines the devices and/or unit's activation status, determines the devices' and/or units' loading, and any other system level operation that affects the performance level of the system 10. For example, the DS managing unit 18 may receive and aggregate network management alarms, alerts, errors, status information, performance information, and messages from the devices 12-14 and/or the DS processing unit 16, storage integrity processing unit 20 and DSN memory 22. For example, the DS managing unit 18 may receive a simple network management protocol (SNMP) message regarding the status of the DS processing unit 16.

The DS managing unit 18 performs the network maintenance by identifying equipment within the computing system 10 that needs replacing, upgrading, repairing, and/or expanding. For example, the DS managing unit 18 may determine that the DSN memory 22 requires more DS storage units 36 or that one or more of the DS storage units 36 needs updating.

The second primary function of distributed data storage and retrieval function involves a user device 12-14. For instance, when a second type of user device 14 has a data file 38 and/or data block 40 to store in the DSN memory 22, it sends the data file 38 and/or data block 40 to the DS processing unit 16 via its interface 30. As will be described in greater detail with reference to FIG. 2, the interface 30 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). In addition, the interface 30 may attach a user identification code (ID) to the data file 38 and/or data block 40.

The DS processing unit 16 receives the data file 38 and/or data block 40 via its interface 30 and performs a distributed storage (DS) process thereon. The DS processing 34 begins by partitioning the data file 38 and/or data block 40 into one or more data segments, which is represented as Y data segments. For example, the DS processing 34 may partition the data file 38 and/or data block 40 into a fixed byte size segment (e.g., 21 to 2*n* bytes, where n=>2) or a variable byte size segment (e.g., change byte size from segment to segment, or from groups of segments to groups of segments, etc.).

For each of the Y data segments, the DS processing 34 error encodes (e.g., forward error correction (FEC), information dispersal algorithm, erasure coding, or error correction coding) and slices (or slices then error encodes) the data segment into a plurality of error coded (EC) data slices 42-48, which is represented as X slices per data segment. The number of slices (X) per data segment, which corresponds to a number of pillars n, is set in accordance with the distributed data storage parameters and the error coding scheme. For example, if a Reed-Solomon (or other FEC scheme) is used in an X/T system, then a data segment Y is divided into X slices, where T number of slices is needed to reconstruct the original data segment (i.e., T is the threshold). As a few specific examples, the X/T factor may be 5/3; 6/4; 8/6; 8/5; 16/10.

For each data slice 42-48, the DS processing unit 16 creates a unique slice name and appends it to the corresponding slice 42-48. The slice name includes universal DSN memory addressing routing information (e.g., virtual memory addresses in the DSN memory 22) and user-specific information (e.g., user ID, file name, data block identifier, etc.).

The DS processing unit 16 transmits the plurality of EC data slices 42-48 to a plurality of DS units 36 of the DSN memory 22 via the DSN interface 32 and the network 24. The DSN interface 32 formats each of the slices for transmission via the network 24. For example, the DSN interface 32 may utilize an internet protocol (e.g., TCP/IP, etc.) to packetize the slices 42-48 for transmission via the network 24.

The number of DS units 36 receiving the slices 42-48 is dependent on the distributed data storage parameters established by the DS managing unit 18. For example, the DS managing unit 18 may indicate that each slice is to be stored in a different DS storage unit 36. As another example, the DS managing unit 18 may indicate that like slice numbers of different data segments are to be stored in the same DS storage unit 36. For example, the first slice of each of the data segments is to be stored in a first DS storage unit 36, the second slice of each of the data segments is to be stored in a second DS storage unit 36, etc. In this manner, the data is encoded and distributedly stored at physically diverse locations to improve data storage integrity and security. Further examples of encoding the data segments will be provided with reference to one or more of FIGS. 2-24.

Each DS storage unit 36 that receives a slice 42-48 for storage translates the virtual DSN memory address of the slice into a local physical address for storage. Accordingly, each DS storage unit 36 maintains a virtual to physical memory mapping to assist in the storage and retrieval of data.

The first type of user device 12 performs a similar function to store data in the DSN memory 22 with the exception that it includes DS processing 34. As such, the user device 12 encodes and slices the data file 38 and/or data block 40 for storage. The user device 12 then transmits the slices 35 to the DSN memory 22 via its DSN interface 32 and the network 24.

For a second type of user device 14 to retrieve a data file or data block from memory, it issues a read command via its interface 30 to the DS processing unit 16. The DS processing unit 16 performs the DS processing 34 to identify the DS storage units 36 storing the slices of the data file 38 and/or data block 40 based on the read command. The DS processing unit 16 may also communicate with the DS managing unit 18 to verify that the user device 14 is authorized to access the requested data.

When the user device is authorized to access the requested data, the DS processing unit 16 issues slice read commands to at least a threshold number of the DS storage units 36 storing the requested data (e.g., to at least 10 DS units for a 16/10 error coding scheme). Each of the DS storage units 36 receiving the slice read command, verifies the command, accesses its virtual to physical memory mapping, retrieves the requested slice, or slices, and transmits it to the DS processing unit 16.

Once the DS processing unit 16 has received a threshold number T of slices for a data segment, it performs an error decoding function and de-slicing to reconstruct the data segment. When Y number of data segments have been reconstructed, the DS processing unit 16 provides the data file 38 and/or data block 40 to the user device 14. Note that the first type of user device 12 performs a similar process to retrieve a data file 38 and/or data block 40.

The storage integrity processing unit 20 performs the third primary function of data storage integrity verification. In one instance, the storage integrity processing unit 20 periodically retrieves slices 45 of a data file or data block of a user device 12, 14 to verify that one or more slices has not been corrupted or lost (e.g., a DS storage unit 36 failed). The retrieval process mimics the read process previously described. In another instance, the storage integrity processing unit 20 periodically retrieves integrity data of the slices 45 from the appropriate DS storage units 36. The storage integrity processing unit 20 interprets the integrity data to determine if one or more of the slices has a data error or inconsistency (e.g., is corrupted, out-of-date, missing, etc.).

If the storage integrity processing unit 20 determines that one or more slices has an associated error, it rebuilds the corrupted or lost slice(s) in accordance with the error coding scheme. The storage integrity processing unit 20 stores the rebuilt slice, or slices, in the appropriate DS storage unit(s) 36 in a manner that mimics the write process previously described.

While the DS processing unit 16, the DS managing unit 18, and the storage integrity processing unit 20 are shown as separate units, they may be functional units within one or more other components of the computing system 10. For example, the storage integrity processing unit 20 may be a distributed function contained with two or more of the DS units 36; may be a single unit within one of the DS units 36; may be within the DS managing unit 18; may be distributed within user devices (e.g., user devices 12) to verify the data of the corresponding user; and/or may be within the DS processing unit 16.

Figure 2:
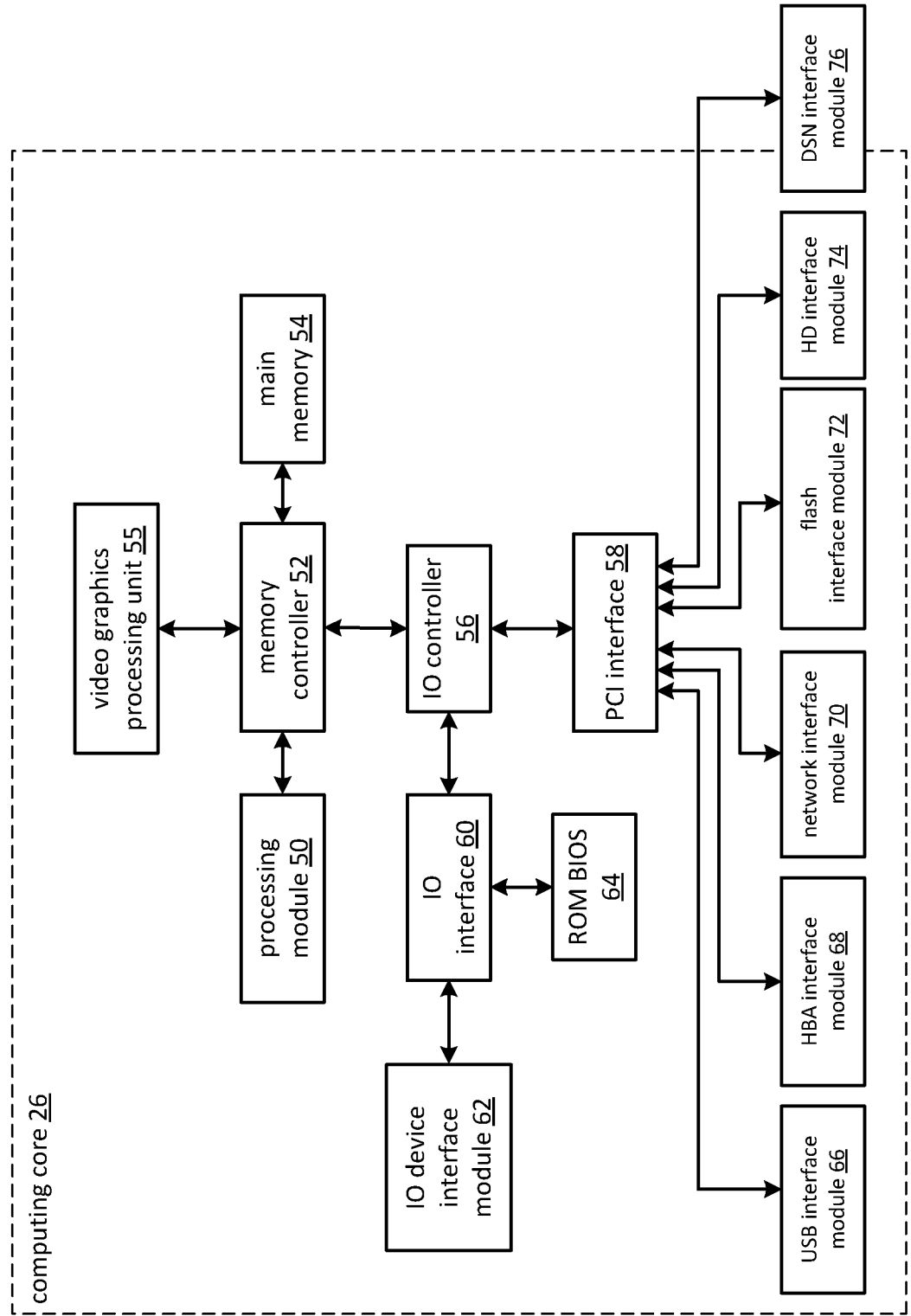
FIG. 2 is a schematic block diagram of an embodiment of a computing core in accordance with the invention.

FIG. 2 is a schematic block diagram of an embodiment of a computing core 26 that includes a processing module 50, a memory controller 52, main memory 54, a video graphics processing unit 55, an input/output (TO) controller 56, a peripheral component interconnect (PCI) interface 58, at least one IO device interface module 62, a read only memory (ROM) basic input output system (BIOS) 64, and one or more memory interface modules. The memory interface module(s) includes one or more of a universal serial bus (USB) interface module 66, a host bus adapter (HBA) interface module 68, a network interface module 70, a flash interface module 72, a hard drive interface module 74, and a DSN interface module 76. Note the DSN interface module 76 and/or the network interface module 70 may function as the interface 30 of the user device 14 of FIG. 1. Further note that the IO device interface module 62 and/or the memory interface modules may be collectively or individually referred to as IO ports.

The processing module 50 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module may have an associated memory and/or memory element, which may be a single memory device, a plurality of memory devices, and/or embedded circuitry of the processing module. Such a memory device may be a read-only memory, random access memory, volatile memory, non-volatile memory, static memory, dynamic memory, flash memory, cache memory, and/or any device that stores digital information. Note that if the processing module includes more than one processing device, the processing devices may be centrally located (e.g., directly coupled together via a wired and/or wireless bus structure) or may be distributedly located (e.g., cloud computing via indirect coupling via a local area network and/or a wide area network). Further note that when the processing module implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element stores, and the processing module executes, hard coded and/or operational instructions corresponding to at least some of the steps and/or functions illustrated in FIGS. 1-24.

Figure 3:
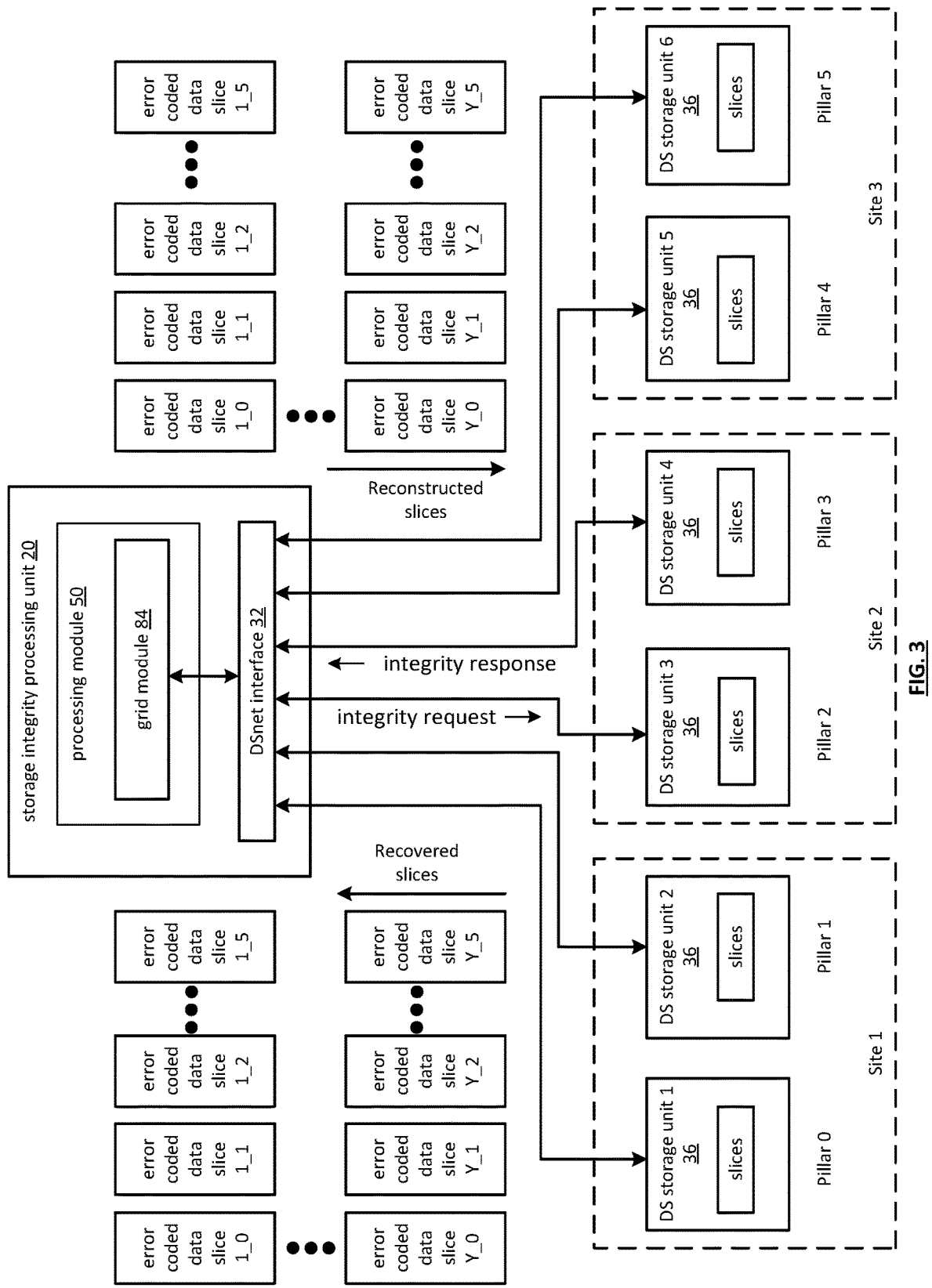
FIG. 3 is a schematic block diagram of an embodiment of a storage integrity processing unit in accordance with the invention.

FIG. 3 is a schematic block diagram of an embodiment of a storage integrity processing unit 20 that includes a processing module 50 in computing core 26 and DSnet interface 32. The processing module 50 is configured to implement a grid module 84. The DSnet interface 32 couples the processing module 50 to a plurality of DS storage units 36 at one or more sites. In this example, six DS storage units (storing pillar 0-pillar 5) are located at three different sites; pillars 0-1 are located at site 1, pillars 2-3 are located at site 2, and pillars 4-5 are located at site 3.

In an example of operation, the grid module 84 receives integrity data regarding one or more pluralities of EC data slices from the DS storage units 36. The DS storage units 36 may provide the integrity data in response to a scan request from the grid module 84 and/or at predetermined intervals. In this example, a plurality of data slices corresponds to a data segment. Note that the data segment may be of a fixed size (e.g., 1 MByte) or of a variable size and it may represent an entire, or portion of, a data file 38 or data object 40.

The grid module 84 evaluates the received integrity data, which may include a cyclic redundancy check (CRC), hash value, etc. of the naming information and/or of the data slices. When the evaluation of the received integrity data yields unfavorable results (e.g., one or more of the integrity data is not as expected; one of the slices names does not match the other slices names because update version is different; the naming information for one of the slices was not received; and/or the CRC of the naming information was not as expected), the integrity module requests naming information of one or more pluralities of data slices from the plurality of DS storage units 36. Note that the naming information includes at least a portion of a slice name, wherein the slice name includes a source name (which is described with reference to one or more subsequent figures). After receiving the naming information, the grid module 84 evaluates it to identify at least one data slice of the one or more of pluralities of data slices having an associated error (e.g., corrupt naming information, missing slice, out-of-date slice, etc.) to generate an identified data slice for rebuilding. In another embodiment, the grid module 84 receives a plurality of data slices from the DS storage units 36 and evaluates the data slices to identify whether one or more of plurality of data slices has an associated error.

The grid module 84 rebuilds the identified data slice(s) having the associated data error. For instance, the grid module 84 may retrieve error coded data slices from the DS storage units and rebuild error coded data slices therefrom. Rebuilding of slices will be discussed in greater detail with reference to FIGS. 4 and 5.

Figure 4:
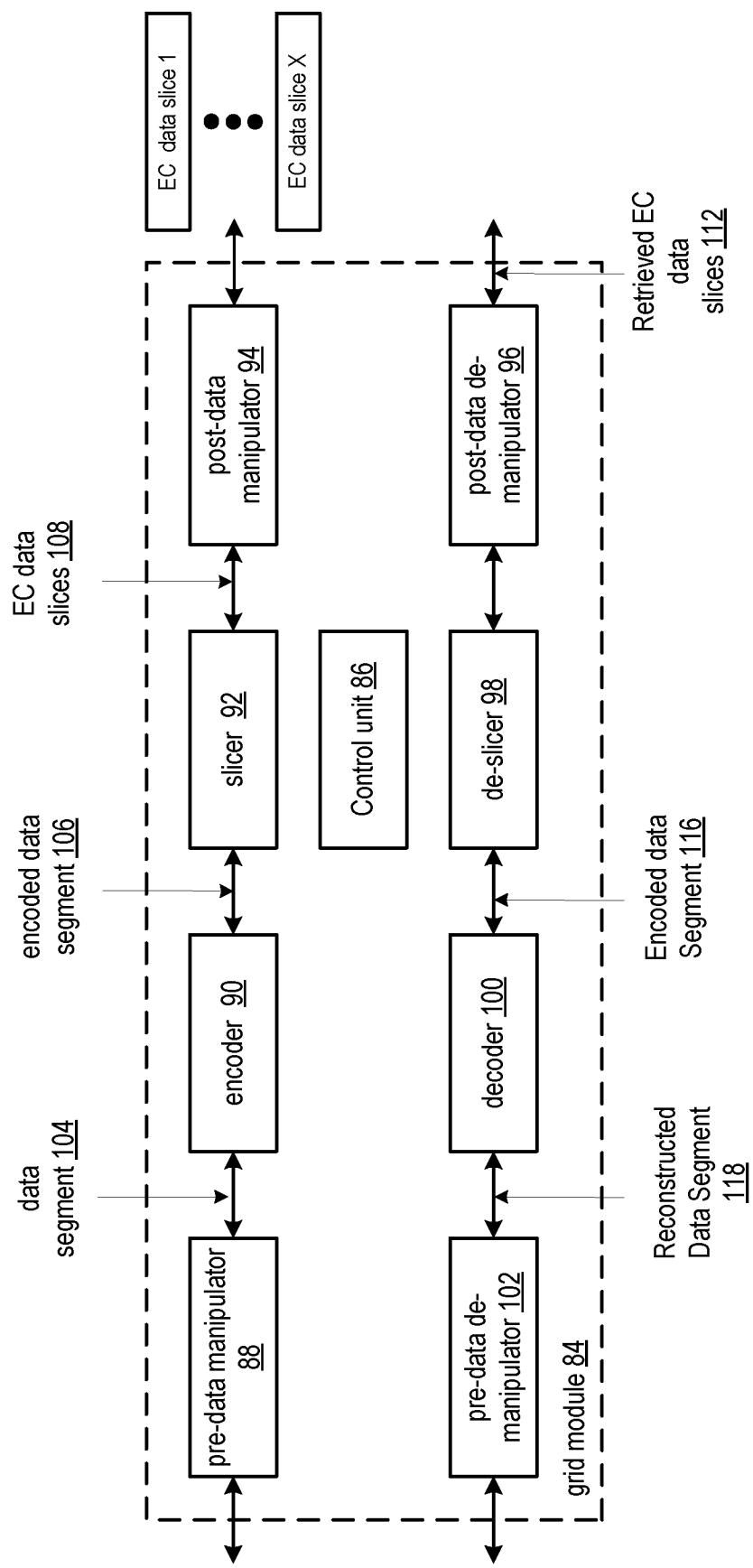
FIG. 4 is a schematic block diagram of an embodiment of a grid module in accordance with the invention.

FIG. 4 is a schematic block diagram of an embodiment of a grid module 84 that includes a control unit 86, a pre-data manipulator 88, an encoder 90, a slicer 92, a post-data manipulator 94, a pre-data de-manipulator 96, a de-slicer 98, a decoder 100, and a post-data de-manipulator 102. In another embodiment, the control unit 86 is partially or completely external to the grid module 84. For example, the control unit 86 may be part of the computing core at a remote location, part of a user device 12, 14, part of the DS managing unit 18 or distributed amongst one or more DS storage units 36.

The control unit 86 assists and/or controls the other elements of the grid module 84 to determine operational parameters, such as the types of pre-data and post-data manipulation/de-manipulation to be applied to an incoming/outgoing data segments 104, if any, the type of error encoding/decoding to apply to the (encoded) data segments 106, and the slicing/de-slicing function. In addition, the control unit 86 may further create and maintain a DS storage memory mapping, status of DS storage units 36, performance history of DS storage units 36, capability of DS storage units 36, prioritization information for DS storage unit usage, and rebuilding criteria (e.g., when to rebuild, when to gather integrity information, etc.). The control unit 86 may determine the operational parameters by combining parameters of the associated vault with other parameters, which will be discussed below.

In an example of operation, the pre-data manipulator 88 receives a data segment 104 and a write instruction from an authorized user device 12, 14. The control unit 86 or gateway module may assist the pre-data manipulator 88 to determine the vault for the authorized user and the data segment 104. When enabled, the pre-data manipulator 88 determines if pre-manipulation of the data segment 104 is required, and if so, what type of pre-manipulation. The determination may be based on one or more factors including a computing system-wide predetermination, a table lookup, vault parameters associated with the user identification, the type of data, security requirements, available DSN memory, performance requirements, and/or other metadata.

The pre-data manipulator 88 manipulates the data segment 104 in accordance with the manipulation determination, which includes one or more of compression (e.g., Lempel-Ziv-Welch, Huffman, Golomb, fractal, wavelet, etc.), signatures (e.g., Digital Signature Algorithm (DSA), Elliptic Curve DSA, Secure Hash Algorithm, etc.), watermarking, tagging, encryption (e.g., Data Encryption Standard, Advanced Encryption Standard, etc.), adding metadata (e.g., time/date stamping, user information, file type, etc.), cyclic redundancy check (e.g., CRC32), and/or other manipulations to enhance the value of the data segment 104. Note that the pre-data de-manipulator 102 performs the complementary functions of the pre-data manipulator 88 when data is retrieved from the DSN memory 22. Note that the pre-data manipulator 88 and pre-data de-manipulator 102 are bypassed when data is recovered and reconstructed in the rebuild path.

The encoder 90 receives the data segment 104 from the pre-data manipulator 88 and encodes the data segment 104 using a forward error correction (FEC) encoding algorithm to produce the encoded data segment 106. The encoder 90 determines what type of encoding algorithm to use based on factors including predetermination in the vault for this user and/or data segment 104, a time based algorithm, user directed, DS managing unit directed, as a function of the data type, as a function of the data segment metadata, and/or any other factor to determine algorithm type. The encoder 90 may utilize a different encoding algorithm for each data segment 104, or the same encoding algorithm for all data segments 104, or some other combination. The encoder 90 may determine the encoding algorithm type to be one of Golay, Multidimensional parity, Reed-Solomon, Hamming, Bose Ray Chauduri Hocquenghem (BCH), Cauchy-Reed-Solomon, or any other FEC encoder. The encoded data segment 106 is of greater size than the data segment 104 by the overhead rate of the encoding algorithm. The encoded data segment 106 is d(X/T), where d is size of the data segment 104, X is the width nor number of slices, and T is the threshold or minimum number of slices to enable reconstruction of the data segment 104.

The corresponding decoding process performed by decoder 98 can accurately recover the data segment provided it receives a threshold number T or more slices. For example, if X=16 and T=10, then the data segment 104 will be recoverable, even if 6 EC data slices per segment are corrupted or missing. Note that the decoder 98 performs the complementary functions of the encoder 90 when data is retrieved from the DSN memory 22.

The slicer 92 receives the encoded data segment 106 from the encoder 90 and transforms the encoded data segment 106 into EC data slices 108 in accordance with the slicing parameter from the vault for this user and/or data segment 104. In one embodiment, data segments 104 are packed one for one into a data slice. In this instance, it is possible to correct many data slices with this method if the error patterns are substantially manifested as individual bit errors. In another example of this instance, entire slices may be lost and hence entire data segments 104 may not be recoverable. In another embodiment, a data segment 104 is dispersed across many data slices (e.g., X wide pillars) to lessen the impact on a given data segment 104 when an entire data slice is lost. Less data per segment is lost, when a data slice is lost, as the data segment 104 is dispersed across more slices. The slicing is discussed in greater detail with reference to FIG. 5. Note that the de-slicer 100 performs the complementary functions of the slicer 92 when data is retrieved from the DSN memory 22.

The post-data manipulator 94 receives EC data slices 108 from the slicer 92. The post-data manipulator 94 determines if post-manipulation of the EC data slices 108 is required, and if so, what type of post-manipulation. The determination may be driven by one or more factors including a computing system-wide predetermination, parameters in the vault for this user, a table lookup, the user identification, the type of data, security requirements, available DSN memory, performance requirements, and/or other metadata. The post-data manipulator 94 manipulates the EC data slices 108 in accordance with the manipulation determination. The manipulation may include one or more of slice level compression, signatures, encryption, CRC, addressing, watermarking, tagging, adding metadata, and/or other manipulation to improve the effectiveness of the computing system. The post-data manipulator 94 passes the resulting EC data slices for storage in the DSN memory 22. Note that the post-data de-manipulator 96 performs the complementary functions of the post-data manipulator 94 when data is retrieved from the DSN memory 22.

In an example of operation, the grid module 84 performs a rebuild operation for an identified data slice with an associated error. The identified data slice is one of a number X of data slices generated from a data segment. The grid module 84 retrieves at least a threshold number T of the X data slices of the data segment. The grid module 84 may retrieve vault parameters based on a vault identifier contained in the slice name, wherein the vault parameters include information regarding the type of post-data manipulation, the slicing/de-slicing function, and the encoding/decoding function. Based on these parameters, the retrieved EC data slices 112 shown in FIG. 4 are post-data de-manipulated and then are de-sliced to generate encoded data segment 116. The encoded data segment 116 is decoded to produce a reconstructed data segment 118. The reconstructed data segment 118 is then encoded and sliced to generate a rebuilt data slice corresponding to the identified data slice.

Figure 5:
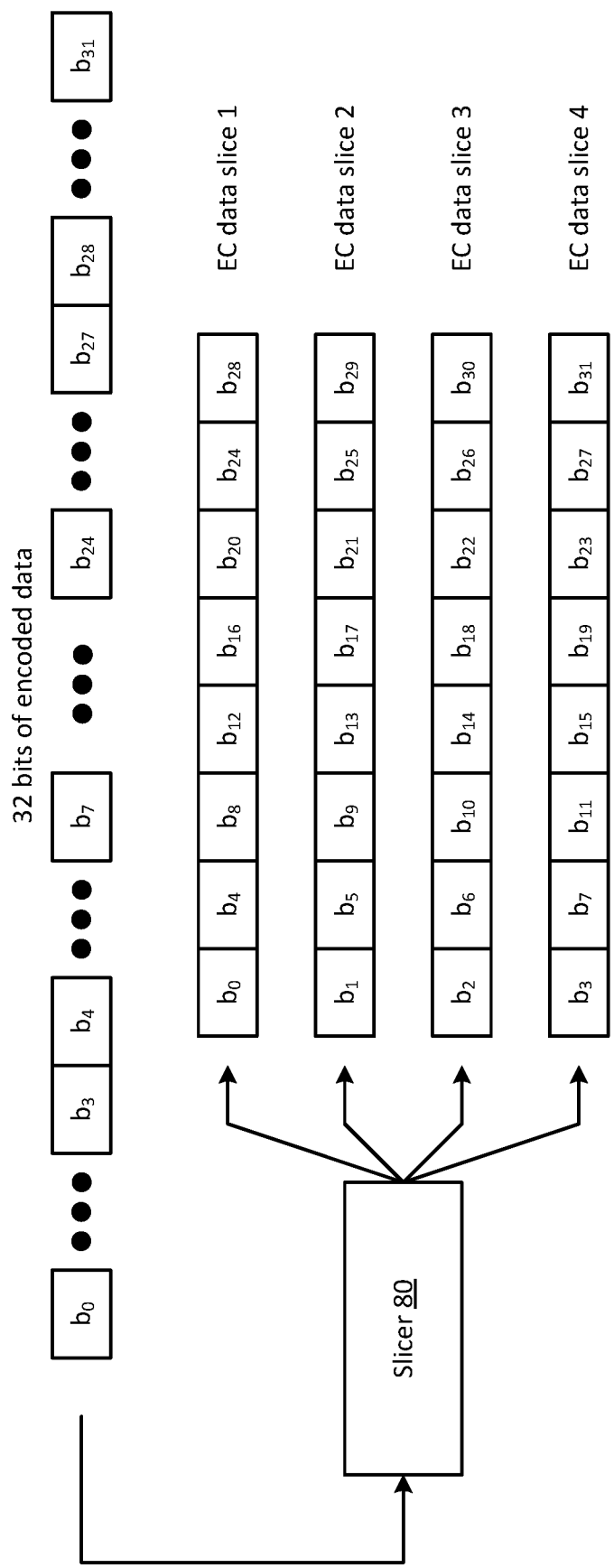
FIG. 5 is a diagram of an example embodiment of error coded data slice creation in accordance with the invention.

FIG. 5 is a diagram of an example embodiment of error coded data slice creation wherein the slicer 92 creates four EC data slices from a thirty-two bit encoded data segment. The slicer 92 disperses the bits from the encoded data segment across the EC data slices wrapping around from the last slice to the first slice over and over (i.e., interleaves the bits among the slices). Each EC data slice, for this data segment, is stored on a different DS storage unit 36. In this example, encoded data segment bits 0, 4, 8, 12, 16, 20, 24, and 28 form EC data slice 1; encoded data segment bits 1, 5, 9, 13, 17, 25, and 29 form EC data slice 2; encoded data segment bits 2, 6, 10, 14, 18, 22, 26, and 30 form EC data slice 3; and encoded data segment bits 3, 7, 11, 15, 19, 23, 27, and 31 form EC data slice 4. In a 4/3 system (a width of 4 pillars and a read threshold of 3), one EC data slice can be lost and the data segment can still be accurately recovered. Note that more slices produce a larger distance between consecutive encoded data segment bits of a slice, which improves the error resiliency.

Figure 6:
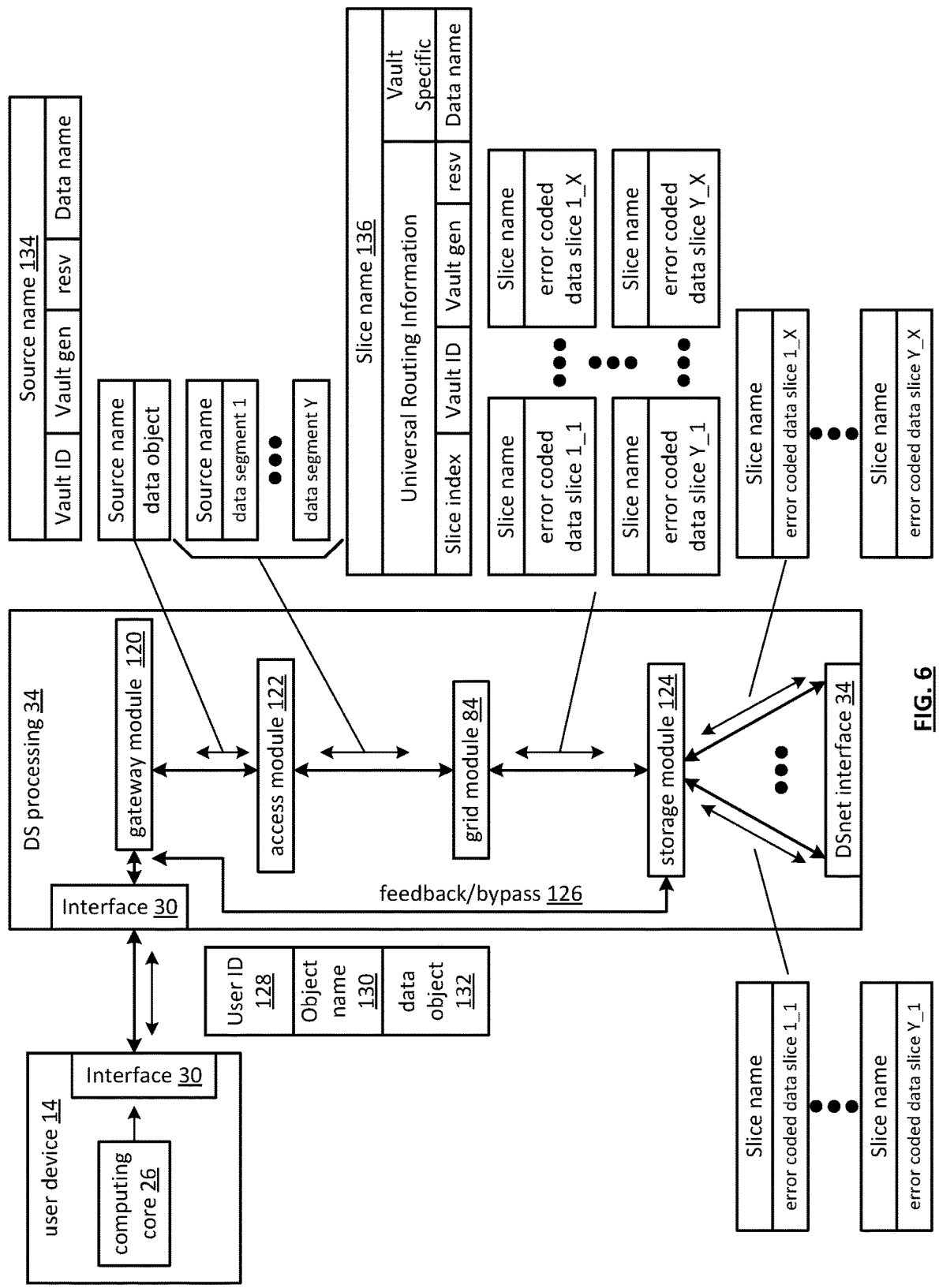
FIG. 6 is a diagram of an example embodiment of a distributed storage (DS) processing unit in accordance with the invention.

FIG. 6 is a schematic block diagram of an embodiment of DS processing module 34 of user device 12 and/or of the DS processing unit 16. The DS processing module 34 includes a gateway module 120, an access module 122, a grid module 84, a storage module 124, and a bypass/feedback path 126. The DS processing module 34 may also include an interface 32 and the DSnet interface 34 or the interfaces 32 and 34 may be part of user 12, 14 or of the DS processing unit 16.

In an example of storing data, the gateway module 120 of the DS processing module 34 receives an incoming data object 132 with an object name 130 and user ID 128 (e.g., a data file, a data block, an EC data slice, etc.), authenticates the user associated with the data object, obtains user information of the authenticated user, and assigns a source name 134 to the data object 132 in accordance with the user information. The gateway module 120 determines the source name 134 based on the vault identifier and the data object 132. For example, the source name 134 may contain a data name (block number or a file number), the vault generation number, a reserved field, and a vault identifier. The data name may be randomly assigned but is associated with the user data object.

To authenticate the user, the gateway module 120 verifies the user ID 128 with the DS managing unit 18 and/or another authenticating unit. If the user ID 128 is verified, the gateway module 120 retrieves the user information from the DS managing unit 18, the user device 12, 14 and/or the other authenticating unit based on the user ID.

The user information includes a vault identifier, operational parameters, and user attributes (e.g., user data, billing information, etc.). A vault identifier identifies a vault, which is a virtual memory space that maps to a set of DS storage units 36. For example, vault 1 (i.e., user 1's DSN memory space) includes eight DS storage units (X=8 wide) and vault 2 (i.e., user 2's DSN memory space) includes sixteen DS storage units (X=16 wide). The operational parameters may include an error coding algorithm, the width n (number of pillars X or slices per segment for this vault), a read threshold T, an encryption algorithm, a slicing parameter, a compression algorithm, an integrity check method, caching settings, parallelism settings, and/or other parameters that may be used to access the DSN memory layer.

The gateway module 120 may utilize the bypass/feedback path 126 to transfer an incoming EC data slice to another DS storage unit 36 when the DS processing module 34 determines that the EC data should be transferred.

The access module 122 receives the data object 132 and creates a series of data segments 1 through Y therefrom. The number of segments Y may be chosen or random based on a selected segment size and the size of the data object. For example, if the number of segments is chosen to be a fixed number, then the size of the segments varies as a function of the size of the data object. For instance, if the data object is an image file of 4,194,304 eight bit bytes (e.g., 33,554,432 bits) and the number of segments Y=131,072, then each segment is 256 bits or 32 bytes. As another example, if segment sized is fixed, then the number of segments Y varies based on the size of data object. For instance, if the data object is an image file of 4,194,304 bytes and the fixed size of each segment is 4,096 bytes, the then number of segments Y=1,024. Note that each segment is associated with the source name.

The grid module 84, as previously discussed, may pre-manipulate (e.g., compression, encryption, cyclic redundancy check (CRC), etc.) the data segment before creating X error coded data slices for each data segment. The grid module 84 creates XY error coded data slices for the Y data segments of the data object. The grid module 84 adds forward error correction bits to the data segment bits in accordance with an error coding algorithm (e.g., Reed-Solomon, Convolution encoding, Trellis encoding, etc.) to produce an encoded data segment. The grid module 84 determines the slice name and attaches the unique slice name to each EC data slice.

The number of pillars, or slices X per data segment (e.g., X=16) is chosen as a function of the error coding objectives. The DS processing module 34 may utilize different error coding parameters for EC data slices based on guidance from one or more of a user vault (e.g., stored parameters for this user), a command from the DS managing unit 18 or other system element, priority of the EC data slice, type of data in the EC data slice, and/or retrieval speed requirements. A read threshold T (e.g., T=10) of the error coding algorithm is the minimum number of error-free error coded data slices required to be able to reconstruct a data segment. The DS processing unit 34 can compensate for X−T (e.g., 16−10=6) missing, out-of-date, and/or corrupted error coded data slices per data segment.

The grid module 84 receives each data segment 1-Y and, for each data segment generates X number of error coded (EC) slices using an error coding function. The grid module 84 also determines the DS storage units 36 for storing the EC data slices based on a dispersed storage memory mapping associated with the user's vault and/or DS storage unit 36 attributes, which include availability, self-selection, performance history, link speed, link latency, ownership, available DSN memory, domain, cost, a prioritization scheme, a centralized selection message from another source, a lookup table, data ownership, and/or any other factor to optimize the operation of the computing system. A slice name 136 is then appended to the EC data slices. For example, the slice name 134 may contain universal routing information, vault specific information, slice index, vault identifier, vault generation number, a reserved field, and a vault identifier.

The storage module 124 may perform integrity checks on the EC data slices and then transmit the EC data slices 1 through X of each segment 1 through Y to the DS storage units 36. The DS storage units 36 may store the EC data slices and locally keep a table to convert virtual DSN addresses into physical storage addresses. In an embodiment, the number of DS storage units 36 is equal to or greater than the number of pillars (slices X per segment) so that no more than one error coded data slice of the same data segment is stored on the same DS storage unit 36. Further note that EC data slices of the same pillar number but of different segments (e.g., EC data slice 1 of data segment 1 and EC data slice 1 of data segment 2) may be stored on the same or different DS storage units 36.

In an example of a read operation, the user device 12 or 14 sends a read request to the DS processing module 34, which authenticates the request. When the request is authentic, the DS processing module 34 sends a read message to each of the DS storage units 36 storing slices of the data object being read. The slices are received via the DSnet interface 34 and processed by the storage module 124, which performs a parity check and provides the slices to the grid module 84. The grid module 84 de-slices and decodes the slices of a data segment to reconstruct the data segment. The access module 122 reconstructs the data object from the data segments and the gateway module 120 formats the data object for transmission to the user device.

Figure 7:
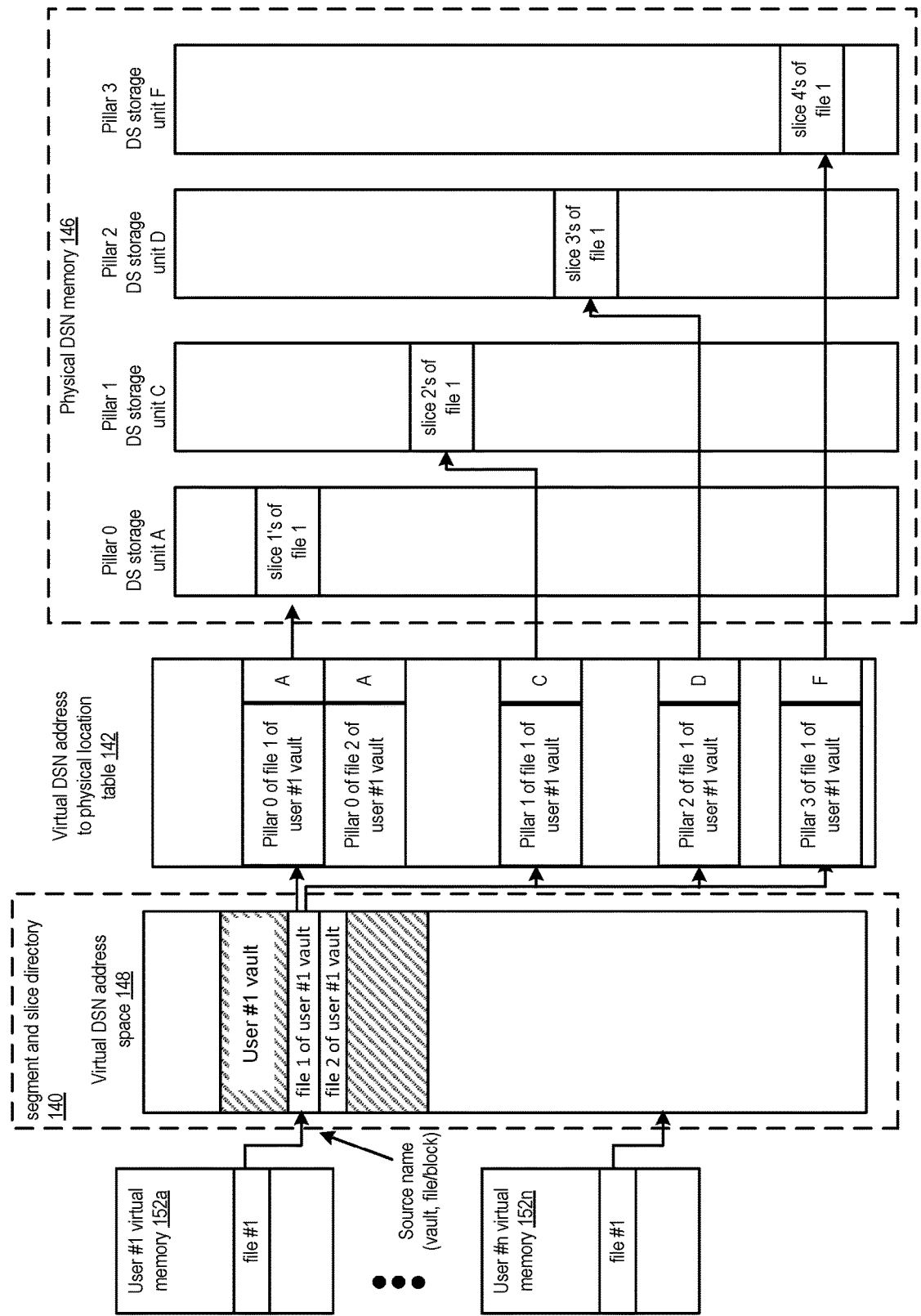
FIG. 7 is a schematic block diagram of an embodiment of a file system hierarchy in accordance with the invention.

FIG. 7 is a schematic block diagram of an embodiment of a file system hierarchy including a plurality of user virtual memories, a segment and slice directory 140, a virtual dispersed storage network (DSN) address to physical location table 142, and a physical dispersed storage network (DSN) memory 146. The file system hierarchy may be utilized to translate the user virtual memory system to the physical DSN memory 146 by translating the user virtual memory address into a virtual dispersed storage network (DSN) address space 148 and then to the physical DSN memory 146. The segment and slice directory 140 includes the virtual DSN address space 148 and the physical DSN memory 146 includes a plurality of DS storage units 36 (e.g., A, C, D, and F). In an example, where there are four pillars, there are four slices (X=4) created for each of the Y data segments. Pillars can be allocated to more than one DS storage unit, but a given DS storage unit is not generally assigned to store more than one pillar from a given user (or vault) to improve system robustness (e.g., avoiding loss of multiple slices as a result of a single DS storage unit failure).

In an embodiment, one of the plurality of user virtual memories 152a-n utilizes a native OS file system to access the segment and slice directory 140 by including source name information in requests such as read, write, delete, list, etc. A source name vault identifier and a file/block name may index into the segment and slice directory 140 to determine the virtual DSN address space 148. A unique virtual vault is associated with each user (e.g., an individual, a group of individuals, a business entity, a group of business entities, etc.) and may contain user attributes (e.g., user identification, billing data, etc.), operational parameters, and a list of the DS storage units that may be utilized to support the user. One or more vaults may be established from the same set of DS storage units in different combinations. A vault identifier is utilized to distinguish between vaults. For example, vault #1 (for user 1) may utilize DS storage units A, C, D, and F (X=4 wide) while vault #2 (user 2) may utilize DS storage units A-H (X=8 wide) (note that DS units B, E, G, and H are not shown).

In an example, the total virtual DSN address space 148 is defined by a forty-eight byte identifier thus creating 256^48 possible slice names. The virtual DSN address space 148 accommodates addressing of EC data slices corresponding to segments of data objects (e.g., data file, blocks, streams) over various generations and vaults. The slice name is a virtual DSN address and remains the same even as different DS storage units are added or deleted from the physical DSN memory 146.

A user has a range of virtual DSN addresses assigned to their vault, user virtual memory 152a-n. For instance, the virtual DSN addresses typically do not change over the operational lifespan of the system for the user. In another instance, the virtual DSN address space 148 is dynamically altered from time to time to provide such benefits as improved security and expansion, retraction, and/or capability. A virtual DSN address space 148 security algorithm may alter the virtual DSN address space 148 according to one or more of a command (e.g., from the DS managing unit 18), a schedule, a detected security breach, or any other trigger. The virtual DSN address may also be encrypted in use thus requiring encryption and decryption steps whenever the virtual DSN address is used.

The vault and file name index used to access the virtual DSN address space 148 and to create the slice names (virtual DSN addresses) may also be used as an index to access the virtual DSN address to physical location table 142. For example, the virtual DSN address to physical location table 142 is sorted by vaults and pillars so that subsequent addresses are organized by pillar of the file segments that have EC data slices with the same slice identifier and hence are typically stored at the same DS storage unit (e.g., slices having a first pillar identifier are stored in DS storage unit A). The output of the access to the virtual DSN address to physical location table 142 is the DS storage unit identifiers.

The slice names may be used as the virtual index to the memory system of each DS storage unit to gain access the physical location of the EC data slices. In this instance, the DS storage unit maintains a local table correlating slice names (virtual DSN address) to the addresses of the physical media internal to the DS storage unit. For example, user number 1 has a vault identified operational parameter of four pillars and pillar 0 is mapped to DS storage unit A, pillar 1 is mapped to DS storage unit C, pillar 2 is mapped to DS storage unit D, and pillar 3 is mapped to DS storage unit F.

Figure 8:
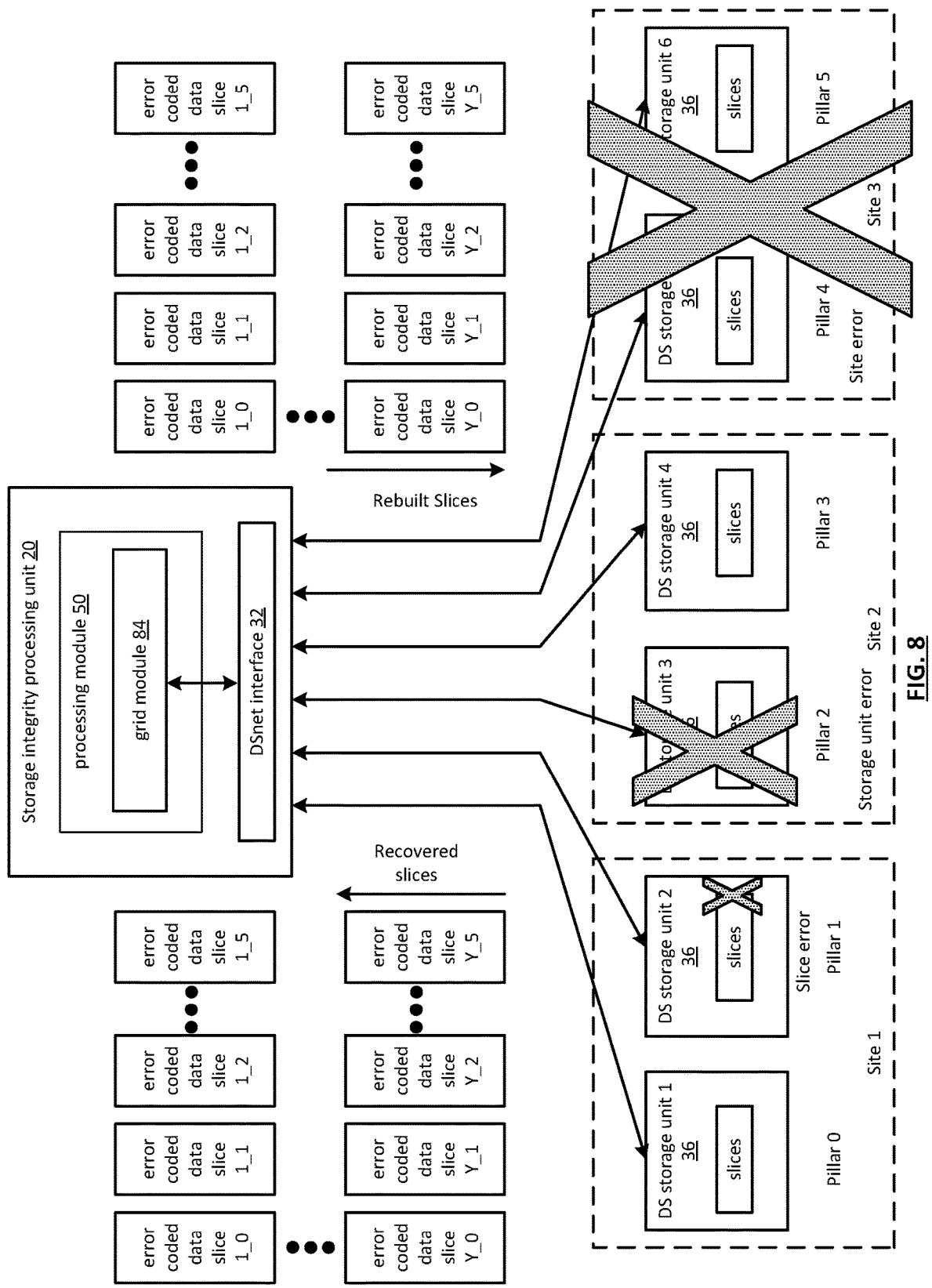
FIG. 8 is a schematic block diagram of an embodiment of a method for data rebuilding in accordance with the present invention.

FIG. 8 is a schematic block diagram of another embodiment of a storage integrity processing unit 20 that includes processing module 50 and DSnet interface 32. The processing module 50 implements grid module 84. To detect for slices having a data inconsistency, the grid module 84 scans EC data slices stored at DS storage units 36. For example, the grid module 84 may scan six pillars of EC data slices for segments 1 to Y of a data object.

In an embodiment, the grid module 84 detects three major types of data errors: slice failure, storage unit failure, and site failure. For a slice failure (illustrated at DS storage unit 2), the grid module 84 rebuilds the slice. For a DS storage unit failure (illustrated at DS storage unit 3), the grid module 84 rebuilds the slices stored within the DS storage unit and stores the rebuilt slices in an available DS storage unit. For a site failure where one or more DS storage units operate (illustrated at site 3 where DS storage units 5 and 6 may be offline), the grid module 84 rebuilds the data slices stored at the site and stores the rebuilt slices at an available site.

In an embodiment, depending on a type of error, the decision to rebuild may be delayed until after a predetermined period of time. The predetermined time period is based on an estimate for correcting the type of error. In another embodiment, depending on the number X of data slices from the data segment that are recoverable, the rebuilding may be immediately performed rather than delayed for the predetermined time period. For example, the rebuilding of data slices at site 3 would begin without waiting a predetermined time period since the site contains two of the six pillars in a 6/4 system and any further loss of slices at another site would render the data segment unrecoverable.

FIG. 9 is a logic flow diagram of an embodiment of a method 200 for data rebuilding in response to a type of error. In step 202, grid module 84 detects an error associated with an EC data slice. In an embodiment, the grid module 84 periodically scans EC data slices to detect data errors regarding a data object. The grid module 84 receives integrity data regarding one or more pluralities of EC data slices from the DS storage units 36. The DS storage units 36 may provide the integrity data in response to a request from the integrity module 85 and/or at predetermined intervals. In another embodiment, the grid module 84 detects a storage unit failure or site failure. The grid module 84 may receive a status update from the storage units or sites or from the DS managing unit 18 or may determine a status from responses or lack thereof from the DS storage units 36 or sites.

Next the grid module 84 identifies the data slice for rebuilding in step 204. In an embodiment, the grid module 84 requests naming information of one or more pluralities of data slices from the plurality of DS storage units 36. For a storage unit failure or site failure, the grid module 84 requests naming information from DS processing unit 15, user device 12, 14 or DS managing unit 18. The naming information includes at least a portion of a slice name. After receiving the naming information, the grid module 84 evaluates it to identify the data slice with an associated error (e.g., corrupt naming information, missing slice, out-of-date slice, etc.) to generate an identified data slice for rebuilding. The grid module 84 then rebuilds the identified data slice in response to a type of error in step 206. The rebuilding of the data slices in accordance with the type of error is discussed further with respect to FIGS. 10-12.

FIG. 10 is a logic flow diagram of an embodiment of a method 210 for data rebuilding in response to a type of error. An address range of encoded data slices is scanned in step 212 and one or more errors are detected that are associated with the data slices, in step 214. In step 216, it is determined whether the type of error is temporary. For example, a storage unit or site failure may be temporary, e.g. due to a network connectivity problem, software problem or power outage. In an embodiment, when the type of error is temporary, a predetermined time period lapses prior to rebuilding to determine whether the failure is corrected.

In another embodiment, when the type of error is temporary, an availability of the other data slices from the data segment is determined in step 218. In an embodiment, the number X of EC data slices stored for a data segment is compared with a number A of available data slices for the data segment in step 220. Assuming a minimum threshold number T of EC data slices are required to rebuild a data segment, when the difference between the number of slices X and available slices A (X−A) compares favorably to the threshold number T (e.g. X−A is greater than T), then the data segment may still be rebuilt in case one or more additional data slices become unavailable. Thus, waiting to rebuild until after a predetermined time period is performed. However, when the difference between the number of slices X and available slices A does not compare favorably (e.g. X−A is equal to T), then rebuilding is performed as shown in step 222 rather than delayed for the predetermined time period. In another embodiment, an availability of the other data slices from the data segment is determined by comparing a number E of data slices with an associated error from the data segment. Depending on the number X of data slices in comparison to the number E of unrecoverable data slices (e.g. E<X−T), the rebuilding is performed rather than delayed for the predetermined time period.

The predetermined time period may vary depending on the type of error and estimated time to correct the type of error. For example, for a storage unit or site failure, a network connectivity error may be provided a shorter predetermined time period than a power outage.

After or during the predetermined time period, the availability of the identified data slice is re-evaluated to determine whether the associated error has been corrected in step 226. When the associated error is corrected, the scan continues for other errors in step 230. When the error is not corrected after the predetermined time period, the identified data slice is rebuilt. In another embodiment, the process returns to step 218 to determine availability of the other X data slices for the data segment. The process may continue to wait one or more predetermined time periods before rebuilding as long as sufficient data slices are available for recovery of the data segment in the event of an additional failure.

Figure 11:
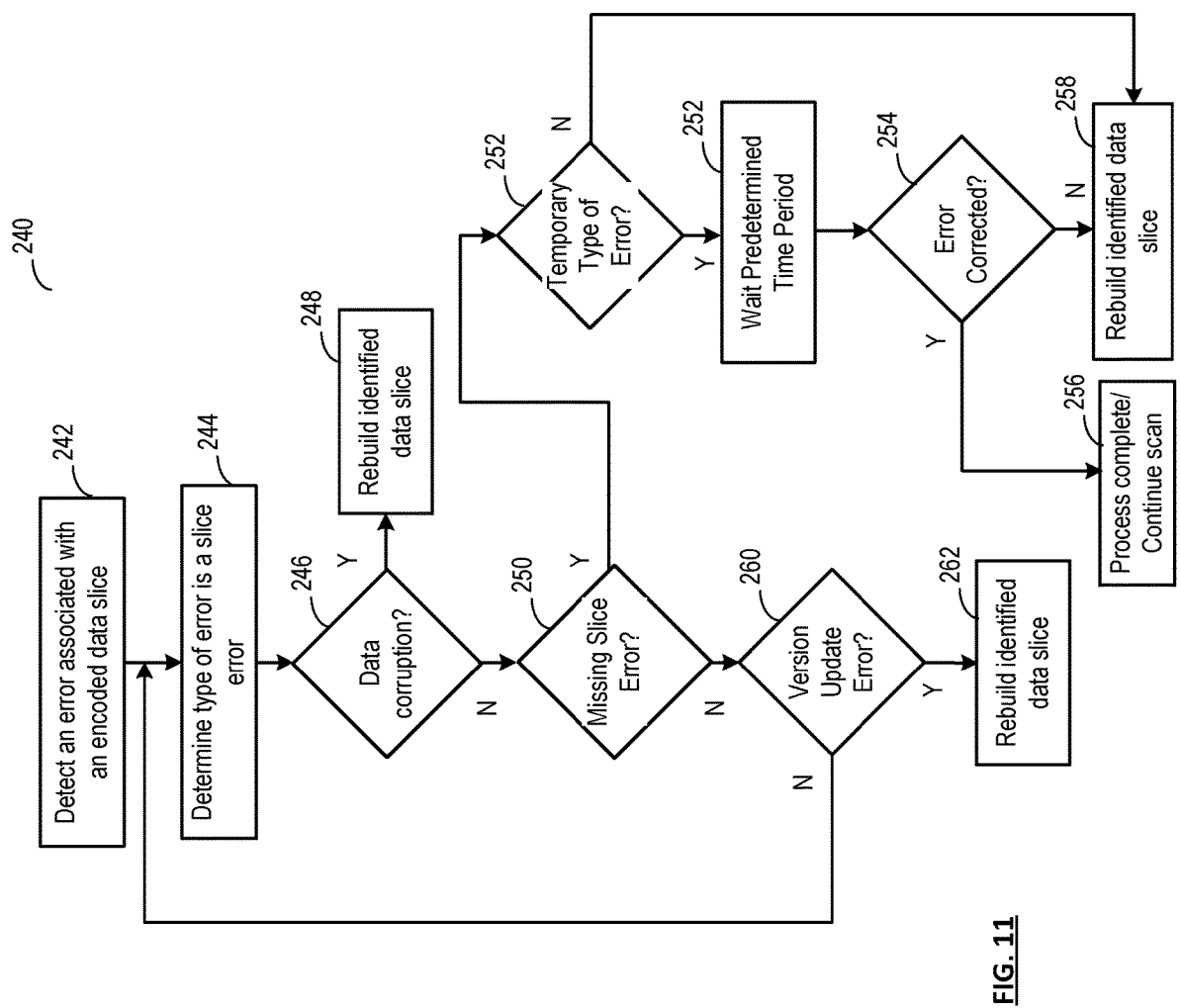
FIG. 11 is a logic flow diagram of another embodiment of a method for data rebuilding in accordance with the present invention.

FIG. 11 is a logic flow diagram of another embodiment of a method 240 for data rebuilding in response to a type of error when the type of error is a slice error. The slice error may involve just one slice or a plurality of data slices, e.g. the same pillar slices for more than one data segment. In step 242, an error is detected associated with an encoded data slice that is determined to be a slice error in step 244. The slice error may result from a corrupted data, from a missing slice, or from a version update error (e.g., failed to successfully store a more recent version). When the slice error includes data corruption in step 246, the corrupted slice is rebuilt from at least a threshold number T of the other X slices of the data segment and the rebuilt slice is restored on the same DS storage unit or another available DS storage unit.

When the slice error is not a result of a corrupted slice, the method continues to step 250 where it is determined whether a data slice is missing. For example, when less than the number X of expected data slices are found for a data segment, it is determined that one or more data slices are missing. When a data slice is missing, the method continues at step 252 where it is determined whether the missing slice is a temporary type of error. The determination is based on whether the error temporarily prevents retrieval of the data slice, e.g., a DS storage unit is temporarily down for updates or repair or network is temporarily down to the DS storage unit, rather than permanently prevents recovery of the data slice, e.g. data slice is not saved or erased due to failures. When the missing slice is a temporary condition, a predetermined period of time is set to resolve the error in step 252. After or during the predetermined time period, it is determined whether the error is resolved in step 254. For example, the missing data slice is now available because, e.g. the DS storage unit returns online or network connectivity issues are resolved. When the missing error is corrected within the predetermined period of time, the process is complete for this particular slice error as shown in step 256. However, when the predetermined period of time expires prior to the error being resolved or the error is not a temporary type of error, the method proceeds to step 258 in which the grid module 84 rebuilds the missing slice and re-stores it on the same DS storage unit or another available DS storage unit.

When the slice error is not a missing slice, the method continues to step 260 wherein the grid module 84 determines whether the slice includes a version update error. The determination may be made, e.g., by comparing the version of other slices for the same segment or by accessing the user vault to determine a version for the slice name. When the slice has a correct version, the method repeats at step 244. When the slice error includes a version update error, the method continues at step 262 where the grid module 84 rebuilds the slice and re-stores it on the same or another available DS storage unit.

Figure 12:
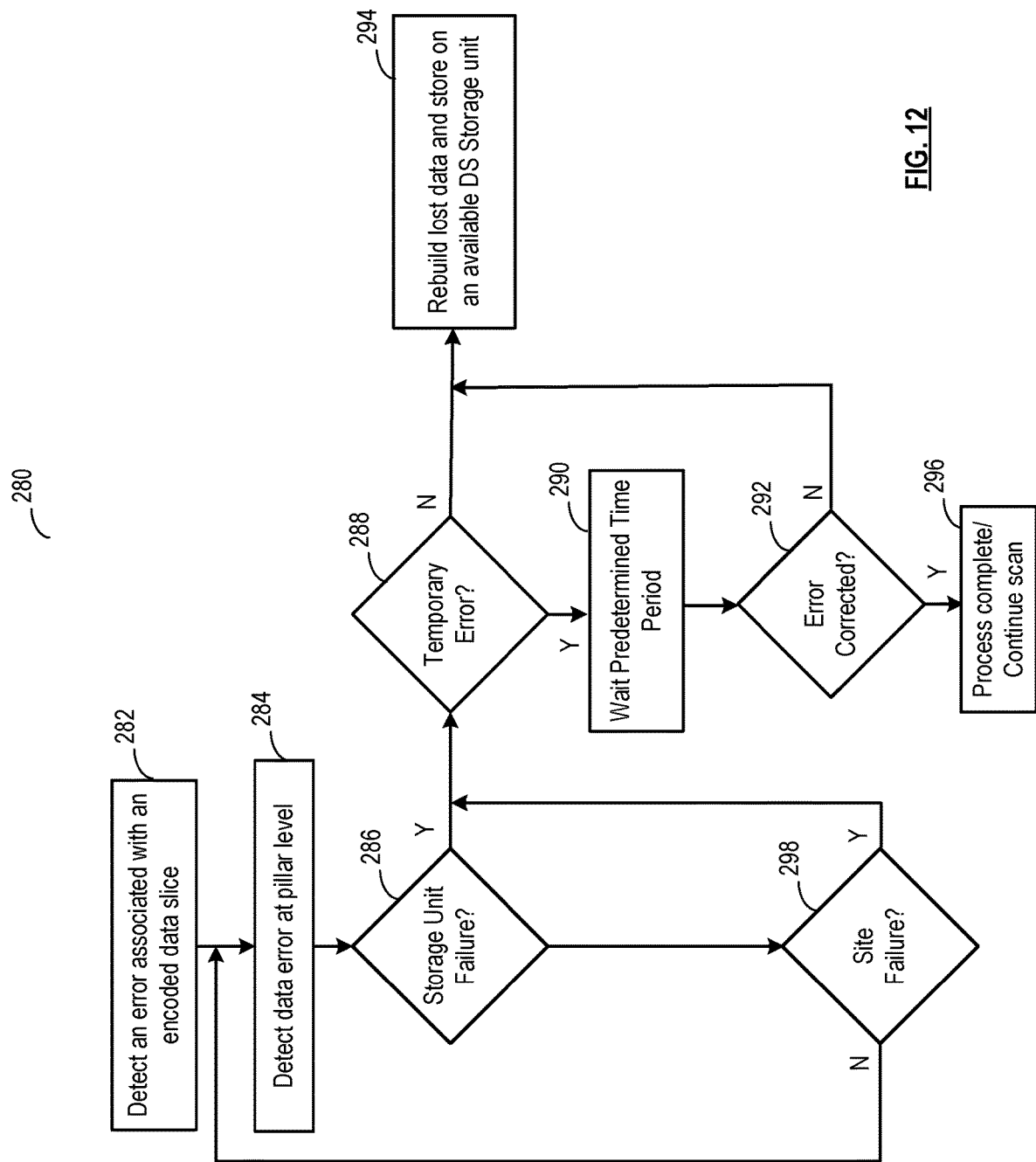
FIG. 12 is a logic flow diagram of another embodiment of a method for data rebuilding in accordance with the present invention.

FIG. 12 is a logic flow diagram of another embodiment of a method 280 for data rebuilding in response to a type of error when the type of error is detected at a pillar level. In step 282, an error is detected associated with an encoded data slice that is determined to be at a pillar level in step 284. The pillar data error may be a result of either or both of a DS storage unit failure or a site failure. In step 286, the grid module 84 determines whether a DS storage unit failure has occurred. A DS storage unit failure is indicated by, e.g., corruption errors in a plurality of data slices stored at a DS storage unit 36, no response by a DS storage unit 36 (e.g., powered off, network down, maintenance mode), a scheduled DS storage unit outage, and/or numerous missing EC data slices. The DS managing unit 18 may schedule DS storage unit outages from time to time to test the rebuilding process or to have certain data slices stored at a DS storage units rebuilt and stored at another DS storage unit, e.g. to upgrade to a new storage unit.

When a storage unit failure is detected in step 286, it is determined whether the DS storage unit failure is a temporary type of error in step 288. The determination is based, e.g., on a maintenance indicator (e.g., the DS storage unit is temporarily down for updates or repair), or a network connectivity indicator (e.g., the network is temporarily down to the DS storage unit) or status update from the DS storage unit 36 or DS managing unit 18. When the site failure is a temporary type of error, the process delays a predetermined amount of time in step 290 prior to rebuilding. When the error is not corrected after the predetermined amount of time or the error is not temporary, the grid module 84 rebuilds the data slices stored on the failed storage unit and restores the slices on another available DS storage unit 36 in step 294 at the same site or a different site. When the storage unit failure is corrected within the predetermined period of time, the process is complete for this particular slice error as shown in step 296.

Continuing at step 298, the process detects whether a site failure has occurred. In some instances, a storage unit failure is due to a site failure. The determination of a site failure is indicated, e.g., by a maintenance indicator (e.g., DS storage units at a site are temporarily down for updates or repair), a network connectivity indicator (e.g., the network is temporarily down to the site), or a scheduled site outage or status update or nonresponsive storage units at a site (e.g., natural disaster). The DS managing unit 18 may schedule DS site outages from time to time to test the rebuilding process or to have data slices stored at a site rebuilt and stored at another site, e.g. to optimize where data slices are stored or to relocate a storage center.

When a site failure occurs, the process continues to step 288 to determine whether the site failure is a temporary condition. The determination may be based on the maintenance indicator (e.g., the DS storage unit is temporarily down for updates or repair), the network connectivity indicator (e.g., the network is temporarily down to the DS storage unit), or the scheduled site outage. When the error is not temporary or the site failure is not corrected after a predetermined time period, the data slices stored on DS storage units 36 at the site are rebuilt and stored on one or more available DS storage units 36 at another site. When no storage unit or site failure has occurred, the method repeats at step 284.

Figure 13:
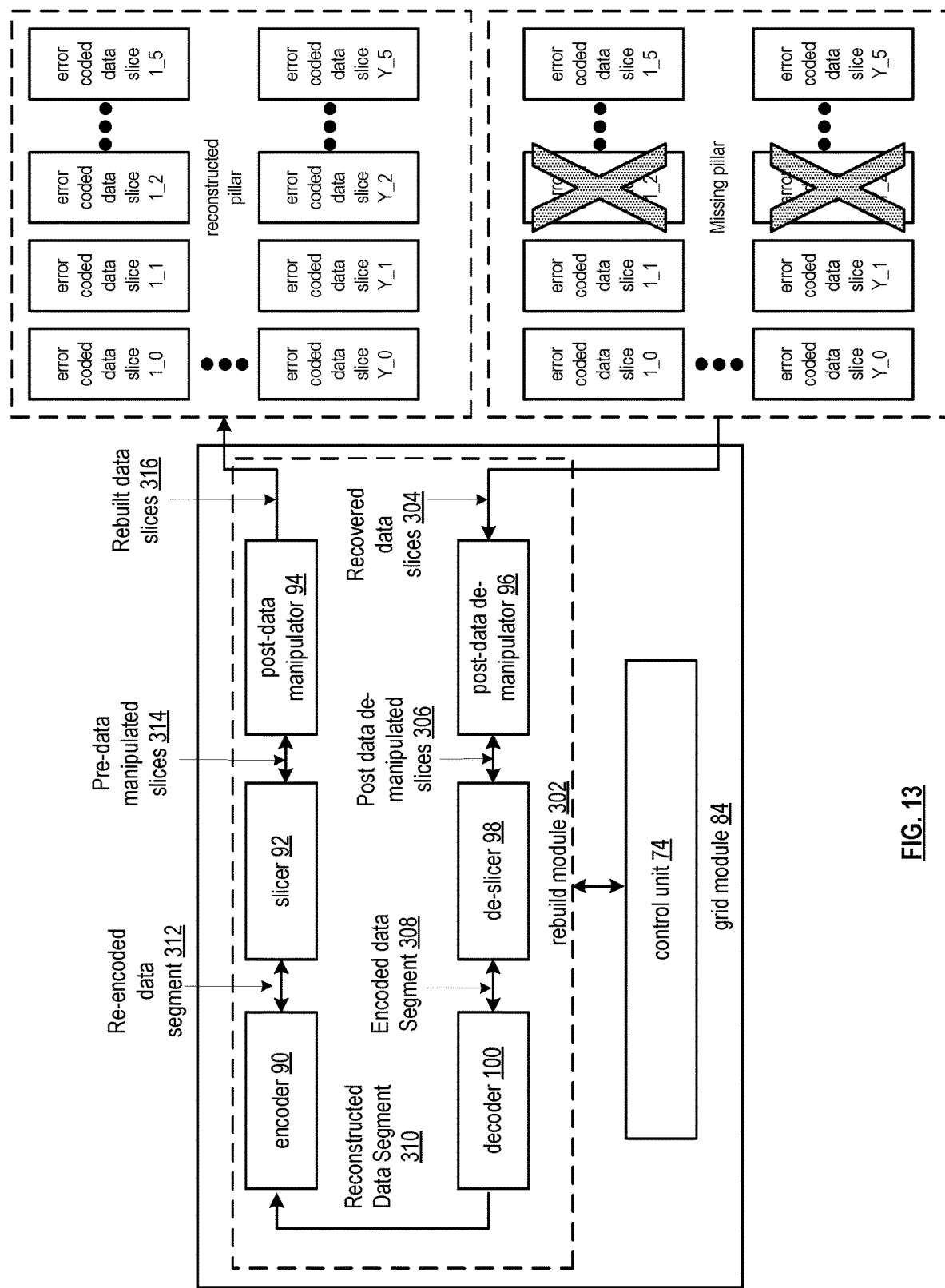
FIG. 13 is a schematic block diagram of another embodiment of a grid module in accordance with the invention.

FIG. 13 is a schematic block diagram of another embodiment of grid module 84 for rebuilding one or more data slices. The grid module 84 includes a rebuild module 302 and control unit 74. The control unit 74 identifies data slices for rebuilding while the rebuild module 302 rebuilds the identified data slices. The control unit 74 may also coordinate functions and sequencing of activities of the rebuild module 302, including encoder 90, slicer 92, post-data manipulator 94, post-data de-manipulator 96, de-slicer 98, and decoder 100.

In an example of operation, pillar 2 slices are missing from a group of six pillars. The control unit 74 retrieves data slices from the companion pillars and provides the recovered data slices 304 to the rebuild module 302. At least a threshold T of data slices (e.g., T=read threshold) from other pillars must be retrieved to rebuild the pillar 2 data slices. The post-data de-manipulator 96 performs any required de-manipulation (e.g., CRC) as described in more detail with reference to FIG. 4 to generate post data de-manipulated slices 306 though in an embodiment, the rebuild module 302 does not perform data de-manipulation or manipulation on the data slices. The de-slicer 98 de-slices post data de-manipulated slices 306 with the missing slice filled with any combination of zeros and ones to generate encoded data segment 308. The decoder 100 decodes encoded data segment 308 utilizing the decoding algorithm specified for this vault and data type to generate reconstructed data segment 310.

Encoder 90 encodes the reconstructed data segment 310 to produce re-encoded data segment 312 based on the encoding algorithm specified for this vault. The slicer 92 slices the re-encoded data segment 312 to produce pre-data manipulated data slices 314. The slicer 92 may reproduce all of the slices or just the slice for the missing pillar. The post-data manipulator 94 manipulates (e.g., CRC) the data slices to produce the rebuilt data slices 316 corresponding to the identified missing data slices. The grid module 84 stores the reconstructed slice in the appropriate DS storage unit according to the virtual DSN address to physical DS storage table.

In another example of operation, the rebuild module 302 receives the recovered data slices 302 and the de-slicer 98 deslices the data slices to generate encoded data segment 308. The encoded data segment 308 is then transmitted to the slicer 92 which reslices it and generates the rebuilt data slices 316. The rebuild module 302 does not perform data de-manipulation or manipulation on the data slices. In addition, the rebuild module 302 does not perform decoding and encoding on the encoded data segment 308 in this embodiment.

FIG. 14 is a logic flow diagram of an embodiment of a method 340 for rebuilding a data slice generated from a data segment. An identification of an encoded data slice for rebuilding is received by the rebuild module 84 in step 342. The grid module 84 retrieves at least a threshold T of data slices needed to reconstruct the data segment in step 344. The grid module 84 reconstructs the data segment in step 346 and generates a rebuilt encoded data slice from the reconstructed data segment in step 348.

Figure 15:
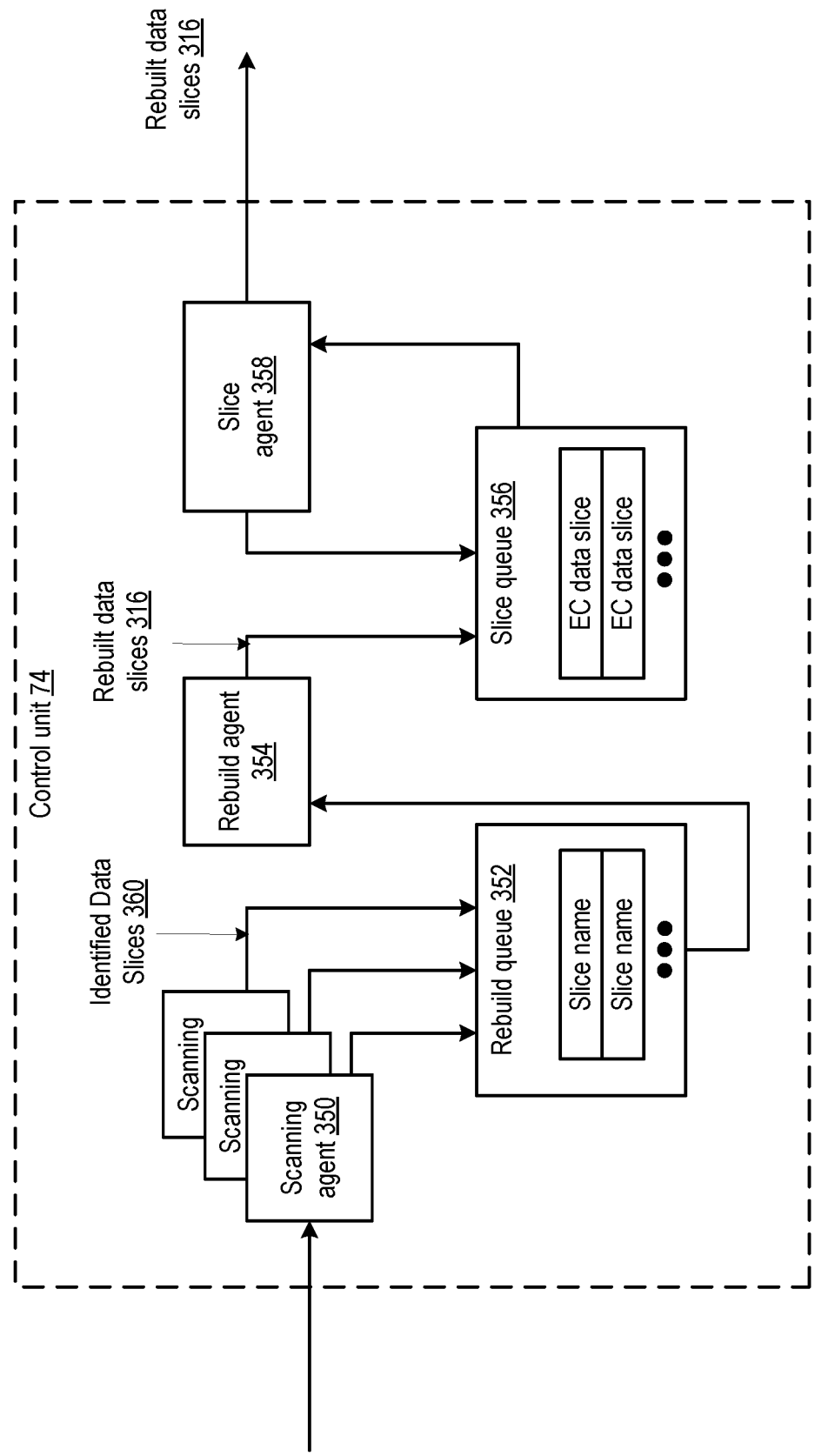
FIG. 15 is a schematic block diagram of an embodiment of a control unit in accordance with the invention.

FIG. 15 is a schematic block diagram of an embodiment of a control unit 74 of the grid module 84. The control unit 74 includes one or more scanning agents 350, a rebuild queue 352, a rebuild agent 354, a slice queue 356 and a slice agent 358. For efficient rebuild scanning, the number of scanning agents varies depending on the size of the virtual DSN addressing space 148. For instance, if the DSN addressing space 148 is relatively small, then a single scanning agent 350 may be sufficient to communicate with the DS storage units 36 to identify slices that need rebuilding. As the DSN addressing space 148 increases, it may be more efficient to divide the DSN addressing space 148 among two or more of the scanning agents 350. Then a scanning agent 350 communicates with DS storage units 36 associated with its range of the DSN addressing space 148.

In an example of operation, a scanning agent 350 communicates with one or more DS storage units 36 associated with its portion of the DSN addressing space 148 to receive integrity data or slices for scanning. When the scanning agent 350 detects an error in a data slice, it stores the slice name or other identification of the identified data slice 360 with an associated error into the rebuild queue 352. The rebuild agent 354 retrieves slice names from the rebuild queue 354 to initiate the rebuilding process by the rebuild module 302. The rebuild agent 162 receives the rebuilt data slice 316 and stores the rebuilt data slice 316 or an identification thereof into the slice queue 356. The slice agent 358 retrieves the rebuilt data slices from the slice queue 356 and stores them to an available DS storage unit 36.

The scanning function of the scanning agents 350 may be centralized or may be distributed among other system elements (e.g., to reduce network traffic) including one or more of the storage integrity processing unit 20, the DS storage units 36, the DS managing unit 18, the DS processing unit 16, or the user device 12, 14 as described further herein. The operation of scanning agents 350 is further described with respect to FIGS. 16-19.

FIG. 16 is a logic flow diagram of an embodiment of a method 380 for scanning an encoded data slice. In step 382, scanning agent 350 receives a scanning address range assignment which includes an address range of one or more pillars within a vault from one or more of the DS processing unit 16, the DS managing unit 18, the storage integrity processing unit 20, and/or the DS storage units 36. In another embodiment, the grid module 84 may determine to scan DS storage units based on a lookup into the virtual DSN address to physical location table 142 and/or based on a virtual address range assignment for the grid module 84. The determination of the scanning address range assignment will be discussed in more detail with reference to FIG. 24. In step 384, the scanning agent determines an encoded data slice has an associated error type. In an embodiment, the scanning agent determines multiple pillars have an associated error, e.g. missing an entire segment of slices or even all the slices for that pillar. The scanning agent 350 identifies the data slices with errors in step 386 and stores identification, e.g. the slice names, of the slices with associated errors in the rebuild queue 352 in step 388.

FIG. 17 is a logic flow diagram of another embodiment of a method 390 for determining a missing data slice error during a scan of data slices. In step 392, the scanning agent 350 scans an address range of one or more pillars within a vault. In step 394, the scanning agent 350 determines whether a data slice is missing. For example, the scanning agent 350 may request the DS storage units 36 to provide a list of slice names within an address range. The request may include a starting slice name (DSN virtual address) and a count of slice names to include in the list (count may be zero or greater). The scanning agent 350 receives a slice name list for slices that should be stored within the address range and compares the slice name list with the list of slices received from the DS storage units 36. In another example, the scanning agent 350 checks sequential slice names for a data segment and determines whether one of the sequential slices is not present at a pillar. The determination may also be based on a comparison of data slices that should be present in one pillar based on the slice names present in the companion pillars. In step 396, the scanning agent 350 identifies the missing data slices and places the slice names or other identification of the data slices in the rebuild queue 352 so that they may be subsequently rebuilt and re-stored. The scan continues in step 398 when no errors are detected.

FIG. 18 is a logic flow diagram of another embodiment of a method 400 for determining a data corruption error during a scan of data slices. In step 402, the scanning agent 350 scans an address range of one or more pillars within a vault. As part of the scanning, the scanning agent checks integrity data stored for each of a plurality of data slices in the address range in step 404. In an embodiment, when a data slice is initially stored, the DS storage units 36 also store integrity data for each EC data slice. The integrity data may be a CRC, a hash, a parity check or other data validity function for a data slice. For example, the DS storage units 36 append a CRC to each EC data slice when the slice is initially stored. The integrity data may be calculated as well from overhead included in the data slice, such as the slice name and version information. The scanning agent 350 then recalculates the integrity data and compares it to the stored integrity data. The scanning agent 350 determines whether the integrity data comparison matches. When the data verification fails, the scanning agent 350 determines that a data corruption error has occurred in step 406. In step 408, the scanning agent 350 identifies the data slices with data corruption and places the slice names or other identification of the data slices in the rebuild queue 352 so that they may be subsequently rebuilt and re-stored. The scan continues in step 410 when no errors are detected.

FIG. 19 is a logic flow diagram of another embodiment of a method 420 for determining a version update error during a scan of data slices. In step 422, the scanning agent 350 scans an address range of one or more pillars within a vault and determines a version for a data slice in the address range in step 424. In step 426, the scanning agent 350 determines whether the data slice is an appropriate version based on the user vault or version number from the other slices for the data segment. The determination may be made, e.g., by comparing the version of other slices for the same segment or by accessing the user vault to determine a version for the slice name. When the data slice does not have a current version in step 428, the scanning agent 350 identifies the data slice and places the slice names or other identification of the data slices in the rebuild queue 352 so that the data slice may be subsequently rebuilt and re-stored. The scan continues in step 430 when no errors are detected.

FIG. 20 is a logic flow diagram of an embodiment of a method 440 of operation of the rebuild agent 354. The rebuild agent 354 selects a data slice from the rebuild queue 352 for rebuilding in step 442. The rebuild agent 354 selects the data slice in a first in first out (FIFO) order or an order based on a prioritization algorithm in step 446. The prioritization algorithm may operate to speed the recovery of key missing data slices and/or may be based on a priority indicator for the data object, a priority indicator for the user, a priority indicator for the data object type (e.g., always recover banking records ahead of home video), slice age (e.g., which is the most outdated), and/or any other priority indicator to provide timely recovery of the most crucial and/or valuable data. In an embodiment, the rebuild agent 354 retrieves at least a threshold number T of data slices from the data segment needed to rebuild the data slice in step 448. The rebuild module 302 rebuilds the data slice using the at least T data slices. The rebuild agent 354 receives the rebuilt data slice in step 448 and stores the rebuilt data slice or an identification thereof into the slice queue 356 in step 450.

FIG. 21 is a logic flow diagram of an embodiment of a method 460 of operation of the slice agent 358. In step 462, the slice agent 358 selects a rebuilt data slices from the slice queue 356 for storage to an available DS storage unit 36. The order in which the slice agent 358 selects rebuilt slices 316 may be a first in first out (FIFO) order or an order based on a prioritization algorithm. The prioritization algorithm may operate to speed the recovery of key missing data slices and/or may be based on a priority indicator for the data object, a priority indicator for the user, a priority indicator for the data object type (e.g., always recover banking records ahead of home video), slice age (e.g., which is the most outdated), and/or any other priority indicator to provide timely recovery of the most crucial and/or valuable data. In step 466, the slice agent 358 determines one of the DS storage units 36 for storing the rebuilt encoded data slice and determines whether the DS storage unit 36 is available in step 468. When it is not available, the process continues to step 466 to determine another DS storage unit 36 is available. In another embodiment, the slice agent 358 re-queues the slice in the slice queue 356. When the DS storage unit is available, the slice agent 358 determines whether the rebuilt data slice is the appropriate version based on the user vault or version number from the other slices for the data segment in step 470. When the version is not current, the slice agent 358 re-queues the slice name in the rebuild queue 352 in step 472 so that the rebuild agent 354 will rebuild the data slice with the appropriate version. When the version is current, the slice agent 358 stores the data slice in the available DS storage unit in step 474.

In an embodiment, the control unit 74 may be partially or completely external to the grid module 84. For example, the control unit 74 may be part of a computing core 26 at a remote location, part of a user device 12, 14, part of the DS managing unit 18, or distributed amongst one or more DS storage units 36 as described further herein. For example, the scanning function may be centralized or it may be distributed amongst system elements including one or more of the DS storage units 36, the DS managing unit 18, the DS processing unit 34, or the user devices 12, 14.

Figure 22A:
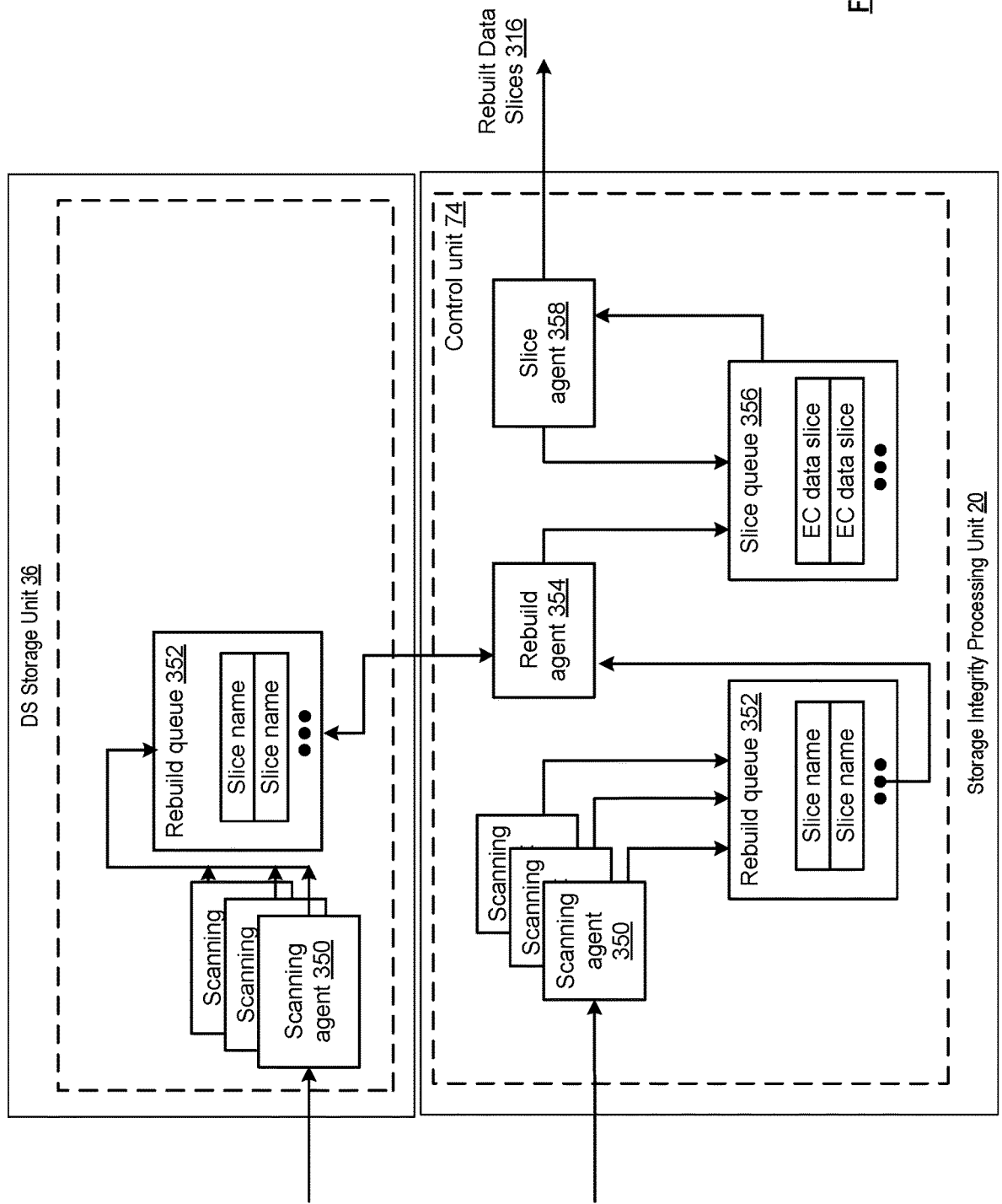
FIG. 22A is a schematic block diagram of another embodiment of a distributed control unit in accordance with the invention.

FIG. 22A is a schematic block diagram of an embodiment of a distributed control unit 74. In this embodiment, a DS storage unit 36 includes one or more scanning agents 350 and a rebuild queue 352. A centralized control unit 74 is located in a storage integrity processing unit 20 or other unit such as DS managing unit 18. In an example of operation, the one or more scanning agents 350 implemented in DS storage unit 36 are assigned a scanning address range. The scanning address range may include data slices stored on the DS storage unit 36 as well as data slices stored at other DS storage units 36. When the scanning agent 350 in DS storage unit 36 detects an error, the scanning agent 350 places the slice name or other identification of the data slice in rebuild queue 352 in the DS storage unit 36. In an embodiment, the rebuild agent 354 in the storage integrity processing unit 20 accesses the rebuild queue in the DS storage unit 36 to select data slices for rebuilding. In another embodiment, the rebuild queue 352 is implemented in the storage integrity processing unit 20, and the scanning agent in the DS storage unit 36 stores the slice name with an associated error in the rebuild queue 352 in the storage integrity processing unit 20.

In an embodiment, the grid module 84, including the rebuild module 302 and control unit 74, may be distributed, in whole or in part, among the storage integrity processing unit 20, the DS managing unit 18, the user devices 12,14 or distributed amongst one or more DS storage units 36. For example, the scanning function of the control unit 74 may be centralized or it may be distributed amongst other system elements. Similarly, the rebuild function of the grid module 84 may be centralized or it may be distributed amongst other system elements, such as the storage integrity processing unit 20, a DS processing unit 16 and DS managing unit 18. In another embodiment, the grid module 84, including the rebuild module 302 and the control unit 74 are located in one or more of the plurality of DS storage units 36.

Figure 22B:
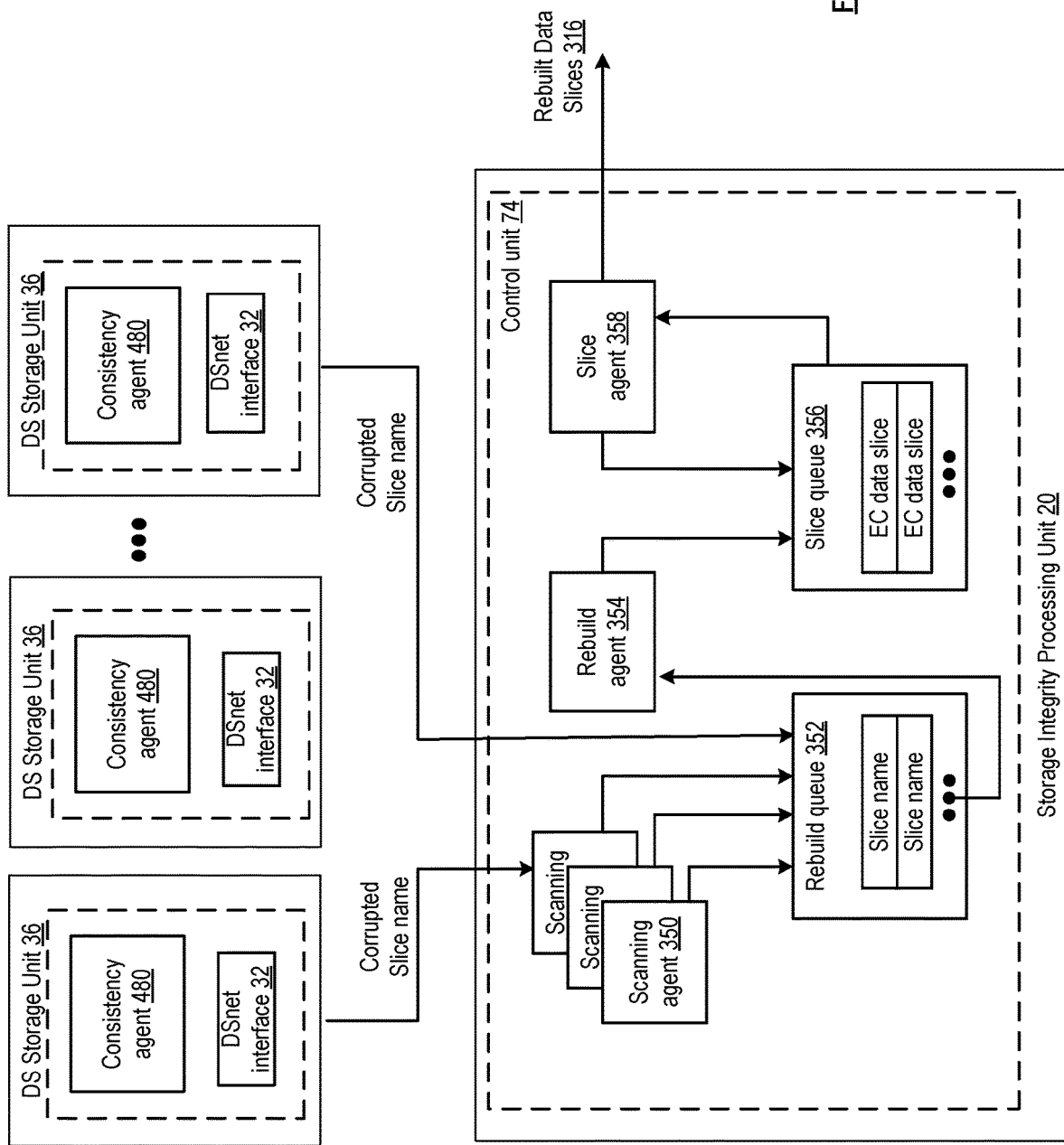
FIG. 22B is a schematic block diagram of another embodiment of a distributed control unit in accordance with the invention.

FIG. 22B is a schematic block diagram of another embodiment of a distributed control unit 74. In this embodiment, a plurality of DS storage units 36 include a consistency agent 480. The consistency agent 480 scans the locally stored data slices, recalculates integrity data for the local data slices and compares integrity data stored for the data slices with the recalculated integrity data. Thus, the consistency agents 480 perform checks on locally stored data slices to determine data corruption errors, as described with respect to FIG. 18. When a consistency agent 480 in a DS storage unit 36 detects an error, the consistency agent 480 places the slice name or other identification of the data slice in rebuild queue 352 in the storage integrity processing unit 20. In another embodiment, the consistency agent 480 transmits the identification of the data slice to the scanning agent 350 in the storage integrity processing unit 20 for storing in the rebuild queue 352. In an embodiment, the scanning agent 350 in the storage integrity processing unit 20 performs scans across multiple DS storage units 36 to determine missing slice errors (as described with respect to FIG. 18) and version update errors (as described with respect to FIG. 19) while the consistency agents 480 in the DS storage units 36 perform scans to determine data corruption errors on locally stored data slices.

Figure 23:
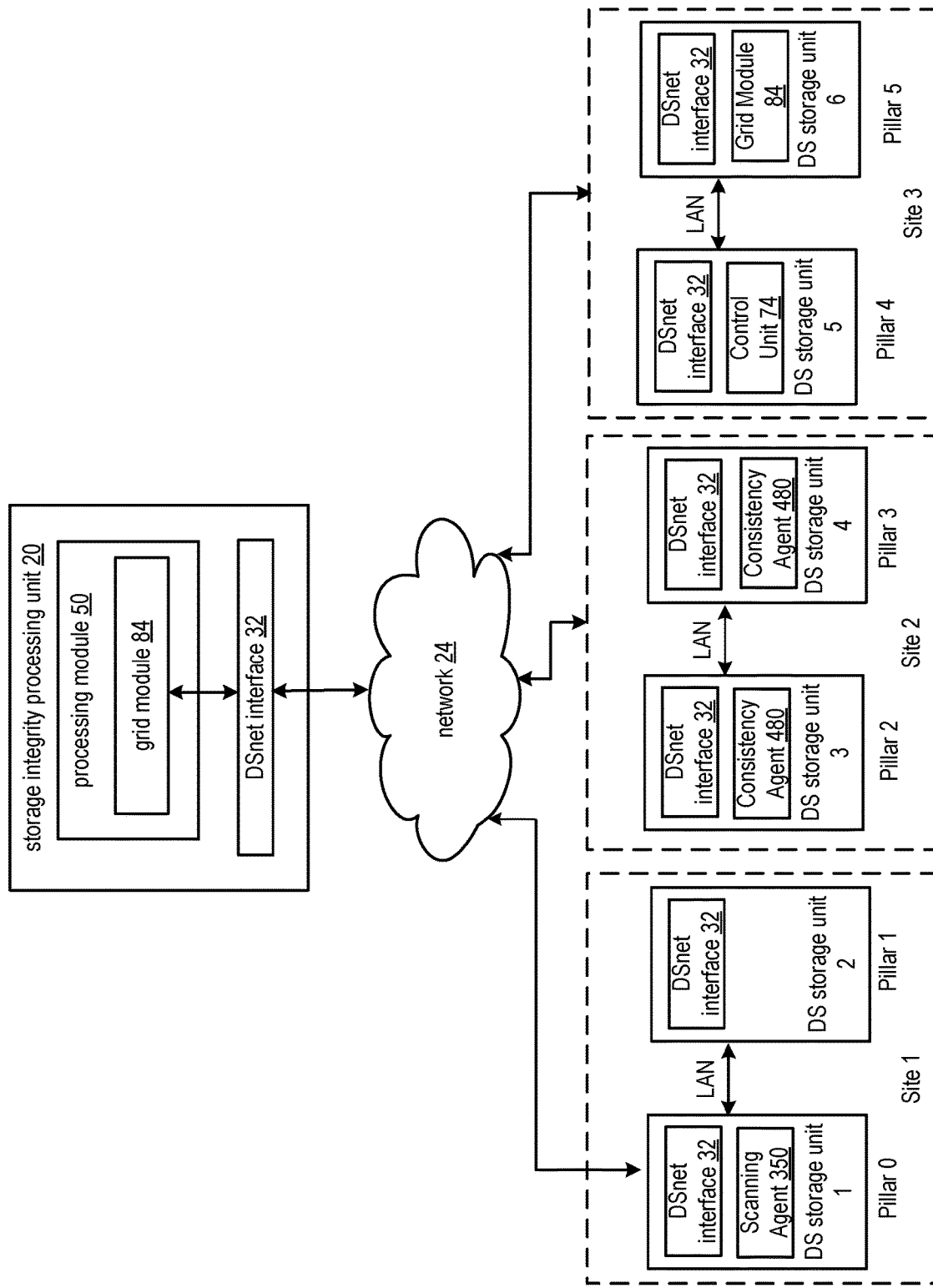
FIG. 23 is a schematic block diagram of another embodiment of a distributed storage network in accordance with the invention.

FIG. 23 illustrates a schematic block diagram of an embodiment of a distributed grid module 84. In this example, the scanning function, control functions and rebuild function of the grid module 84 are distributed amongst one or more of the DS storage units 36 and the storage integrity processing unit 20. At site 1, DS storage unit 1 includes a scanning agent 350 while at site 2 both DS storage unit 3 and 4 include a consistency agent 480. In site 3, DS storage unit 5 includes a control unit 74 while DS storage unit 6 includes a grid module 84 with both a rebuild module 302 and a control unit 74 functions.

In an example of operation, DS storage units 1, 2, 3, 4, 5, 6 share at least one common address range in a virtual DSN address space for a companion set of pillars of at least one common vault. DS storage unit 1 is assigned to scan a particular subset of the common address range for data errors in data slices stored locally and across DS storage units 2,3,4,5,6. DS storage unit 1 issues a scan request for integrity data over LAN to DS storage unit 2 at the same site and over network 24 to the other DS storage units 3,4,5,6. When DS storage unit 1 receives the scan responses from DS storage units 2,3,4,5,6, the scanning agent 350 determines whether data errors are present based on the responses. The errors may include one or more of corrupted slices, missing slices, DS storage unit failures, and/or site failures.

When data errors are detected by scanning agent 350 in DS storage unit 1, a slice name or other identification of data slices with associated errors is transmitted to the grid module 84 in the storage integrity processing unit 20 for rebuilding. In another embodiment, the DS storage unit 1 transmits a slice name or other identification of data slices with associated errors to grid module 84 in DS storage unit 6 for rebuilding. In another embodiment, DS storage unit 1 includes a rebuild queue 352 and stores a slice name or other identification of data slices with associated errors in its rebuild queue 352. A rebuild agent 354 in grid module 84 at storage integrity processing unit 20 or at DS storage unit 6 access the rebuild queue in the DS storage unit 36 to select data slices for rebuilding.

When the scanning function of a grid module 84 is distributed amongst the DS storage units, scanning of data slices can be distributed as well. For example, each DS storage unit with a scanning function can be assigned a portion of an address range to distribute the processing load. In another example, the scanning agent 350 in the DS storage units 36 perform scans across multiple DS storage units 36 to determine missing slice errors (as described with respect to FIG. 18) and version update errors (as described with respect to FIG. 19) while consistency agents 480 in the DS storage units 36 perform scans to determine data corruption errors on locally stored data slices.

FIG. 24 is a schematic block diagram of an embodiment of distributed scanning address range assignments. A dispersed storage memory mapping is shown that specifies virtual DSN address ranges 0-8 by pillar mapped to physical DS storage units A,B,C,D,E,F,G,H,I,J,K,L,M that store information for those address ranges. In this example, the address ranges 0-8 include the virtual DSN addresses assigned to a vault λ. The individual addresses within each address range may specify a unique file identifier within that vault. The letter designation in each pillar signifies the physical DS storage unit 36 that is assigned to store data slices for those address ranges. For example, DS storage unit A is responsible for storing data slices corresponding to pillar 0 for DSN addresses ranges 0-4 and DS storage unit J is responsible for storing data slices corresponding to pillar 0 for DSN addresses ranges 5-8. Pillars 0-5 for the same address range will contain the EC data slices for stored data segments. For example, DS storage units A, B, D, E, F, and H store data slices with an address range 0 corresponding to pillars 0-5 for the same data segments.

The memory mapping specifies scanning address range assignments by companion sets of pillars within the same address ranges. The scanning process for address range 0 may include scans of pillar 0-5 slices in DS storage units A, B, D, E, F, and H since they form the companion pillars for the same data segments. For example, DS storage unit A is assigned to scan address range 0 in DS storage units A, B, D, E, F, and H and DS storage unit J is assigned to scan address range 6 in DS storage units J, C, K, L, G and I. In another embodiment, it is also possible to consolidate some of the scanning ranges. For example, DS storage unit D may scan address ranges 3 and 4 as one range across DS storage units A, C, D, L, G, and H instead of sharing part of that task with DS storage unit L. In a similar way, DS storage unit M may scan address ranges 7 and 8 as one range across DS storage units J, C, K, L, M, and I instead of sharing part of that task with DS storage unit K.

The scanning address range assignments may be predetermined and static or may be altered from time to time as a function of one or more of new DS storage unit additions, storage growth, a load sharing algorithm, an algorithm to exercise the scanning responsibilities, a new network configuration, a new plurality of DS storage unit clusters at one site, and/or other changes that may affect scanning efficiency and effectiveness.

Various examples have described a centralized approach to rebuilding a data slice wherein at least a threshold number T of data slices needed to rebuild the data slice are transmitted to a rebuild function at one location, e.g. a grid module 84 at storage integrity processing module 20. This centralized approach requires network bandwidth from each DS storage unit 36 transmitting one of the at least threshold number T of data slices, even when some of the DS storage units 36 are located at the same site. In another embodiment, the slice rebuilding process includes a de-centralized approach wherein DS storage units 36 that store one of the at least threshold number T of data slices each sequentially compute a portion of the data needed to produce the rebuilt data slice. The de-centralized approach is discussed in more detail with reference to FIGS. 25-33.

Figure 25:
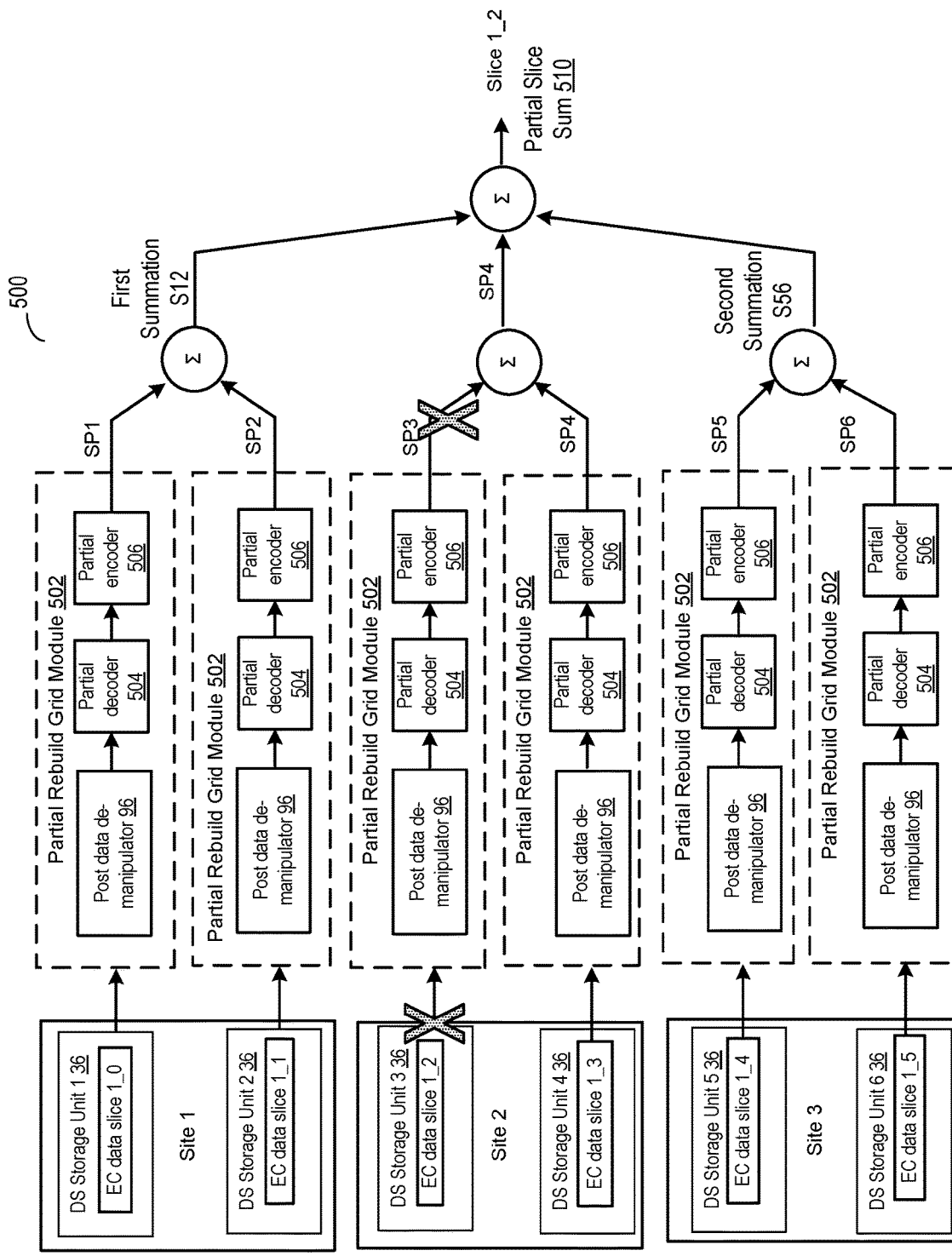
FIG. 25 is a schematic block diagram of another embodiment of a distributed storage network in accordance with the invention.

FIG. 25 is a schematic block diagram of an embodiment of a dispersed storage system 500 with de-centralized slice rebuilding. The dispersed storage system 500 includes a plurality of DS storage units 36 at a plurality of sites. In this example, DS storage units 1 and 2 are at site 1, DS storage units 3 and 4 are at site 2, and DS storage units 5 and 6 are at site 3. Each of the DS storage units 36 include a partial rebuild grid module 502. The partial rebuild grid module 502 includes a post data demanipulator 96, partial decoder 504 and partial encoder 506. In an embodiment, the partial rebuild grid module 502 also includes functionality to reconstruct a data segment from at least a threshold number T of data slices in a centralized rebuilding process.

In the partial rebuilding process, a data slice is rebuilt by combining slice partials generated from at least a threshold number T of data slices in any order (e.g., adding the slice partials individually or adding in one or more subsets). In an example of operation, a slice failure at DS storage unit 3 is identified by partial rebuild grid module 3 and the slice name or other identification of the data slice with an associated error is determined for the identified data slice. When the identified data slice is selected for rebuilding, the grid module 3 determines at least a threshold number T of data slices from the same data segment needed to rebuild the identified data slice.

In the example, DS storage unit 1 stores one of the threshold number T of data slices, i.e. EC data slice 1_0. DS storage unit 1 retrieves EC data slice 1_0 and post-data de-manipulator 96 performs any required data de-manipulation on EC data slice 1_0. The partial decoder performs a decode function on EC data slice 1_0 to generate a partially decoded portion of the data segment. The partial encoder encodes the partially decoded portion of the data segment to produce a partially encoded portion of the data segment, e.g. slice partial (SP1). The partial decode and partial encode steps involve finite field arithmetic for the error control scheme and will be discussed in greater detail with reference to FIGS. 28-31. DS storage unit 2 also performs a partial decode step followed by a partial encode step to produce slice partial SP2 from the second slice EC data slice 1_1. The slice partial SP1 is combined with slice partial SP2 to produce first summation S12. The summation of slice partials includes, for example, typical arithmetic addition, a finite field summation operation, and/or a bit-wise exclusive-OR logical operation.

Similarly DS storage unit 5 performs a partial decode step followed by a partial encode step to produce slice partial SP5 from the EC data slice 1_4, and DS storage unit 6 performs a partial decode step followed by a partial encode step to produce a slice partial (SP6) from the EC data slice 1_5. The slice partial SP5 is combined with slice partial SP6 to produce second summation S56. DS storage unit 4 performs a partial decode step followed by a partial encode step to produce a slice partial (SP4) from the EC data slice 1_3. SP4 is then combined with first summation S12, second summation S56 to generate a partial slice sum 510. The rebuilt EC data slice 1_2 is then generated from the partial slice sum 510. For example, post data manipulation may need to be performed on partial slice sum 510 to generate the rebuilt EC data slice 1_2.

The slice partials in the partial rebuilding process may be combined in any order to generate the partial slice sum. For example, in FIG. 25 at a first level, SP1 and SP2 may be combined and SP5 and SP6 may be combined before those two combinations are combined with SP4. In another example, the combination of SP1 and SP2 from site 1 may be sent to site 3 where the SP1 and SP2 combination is combined with the combination of SP5 and SP6. The combination of SP1, 2, 5, 6 is sent to site 2 where that combination is combined with SP4 to produce the rebuilt EC data slice 1_2.

The sequencing of combining the slice partials in the partial rebuilding process may be determined by the storage integrity processing unit 20, DS managing unit 18, one of the DS storage units 36 and/or DS processing 34. The determination may be based on where the failure occurred, the network topology, the loading level of the DS storage units, which DS storage units are clustered together at the same sites sharing the common LAN, and/or any other factor to improve the efficiency of the recovery. Two sequencing approaches include a ring sequencing and a star sequencing. A ring sequencing begins with one site that generates slice partials and passes the results to the next site until the site with the error receives the results of the other sites. In a star sequencing, each site generates slice partials and passes the results to the site with the error. The star sequencing and ring sequencing are described in greater detail with reference to FIGS. 26 and 27.

Figure 26:
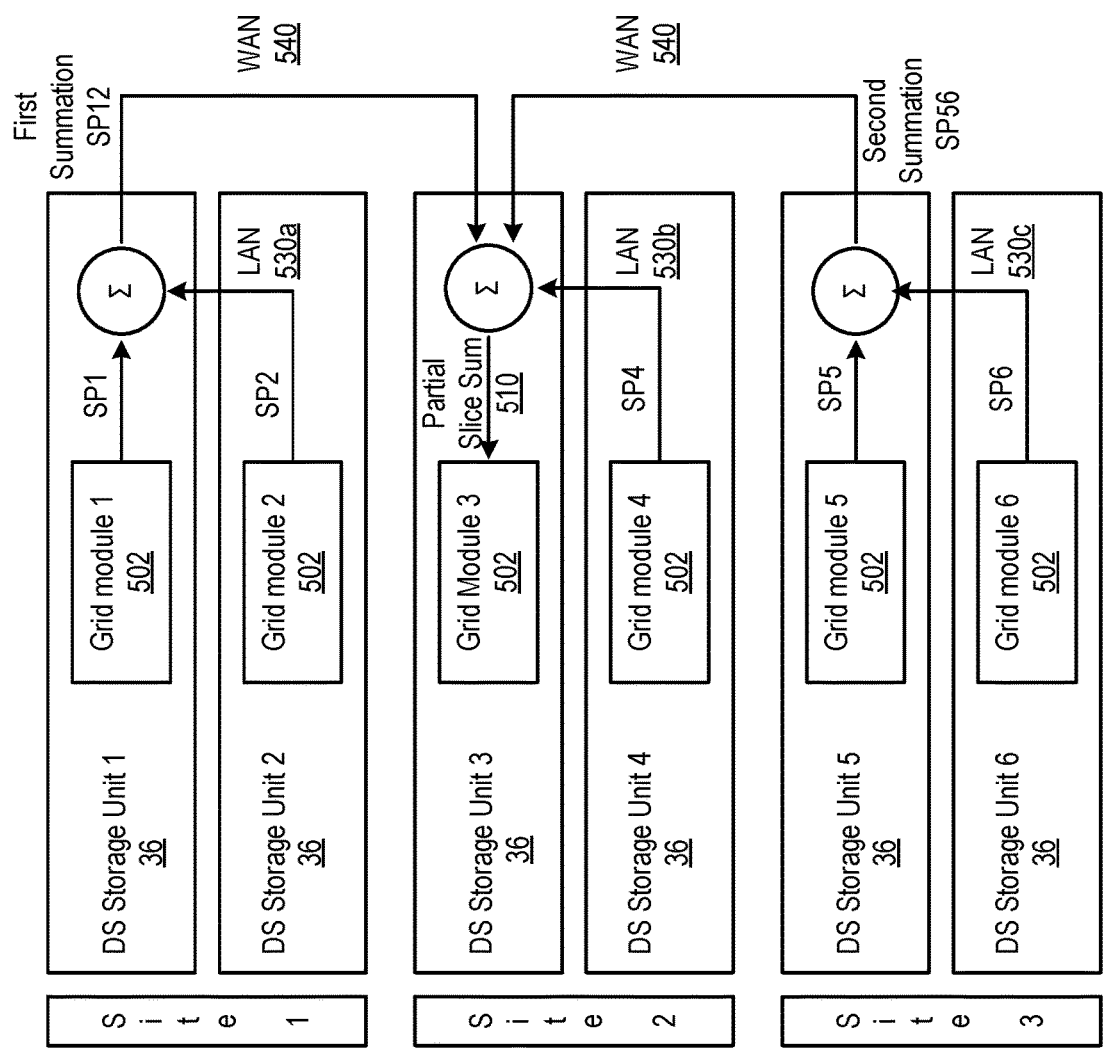
FIG. 26 is a schematic block diagram of another embodiment of data rebuilding in accordance with the invention.

FIG. 26 is a schematic block diagram of another embodiment of a dispersed storage system for partial rebuilding using star sequencing. A plurality of DS storage units 36 each include a partial rebuild grid module 502. LANs 530 couple DS storage units 36 located at the same site while WAN 540 couples DS storage units 36 at different sites. WAN 540 is included for example as a part of network 24 in FIG. 1.

In this example, star sequencing for slice rebuilding is shown. DS storage unit 1 receives partial SP2 from DS storage unit 2 over the LAN 530a and combines slice partial SP2 with slice partial SP1 to generate first summation SP12. The DS storage unit 1 transmits the first summation SP12 to DS storage unit 3. DS storage unit 5 receives slice partial SP6 from DS storage unit 6 over LAN 530c and combines slice partial SP6 with slice partial SP5 to generate second summation SP56. DS storage unit 3 receives second summation SP56 from DS storage unit 5. DS storage unit 3 receives slice partial SP4 over LAN 530b from DS storage unit 4. DS storage unit 3 combines first summation SP12 and second summation SP56 and slice partial SP4 to generate the rebuilt data slice. The rebuilt data slice is restored on DS storage unit 3 or another available storage unit.

Figure 27:
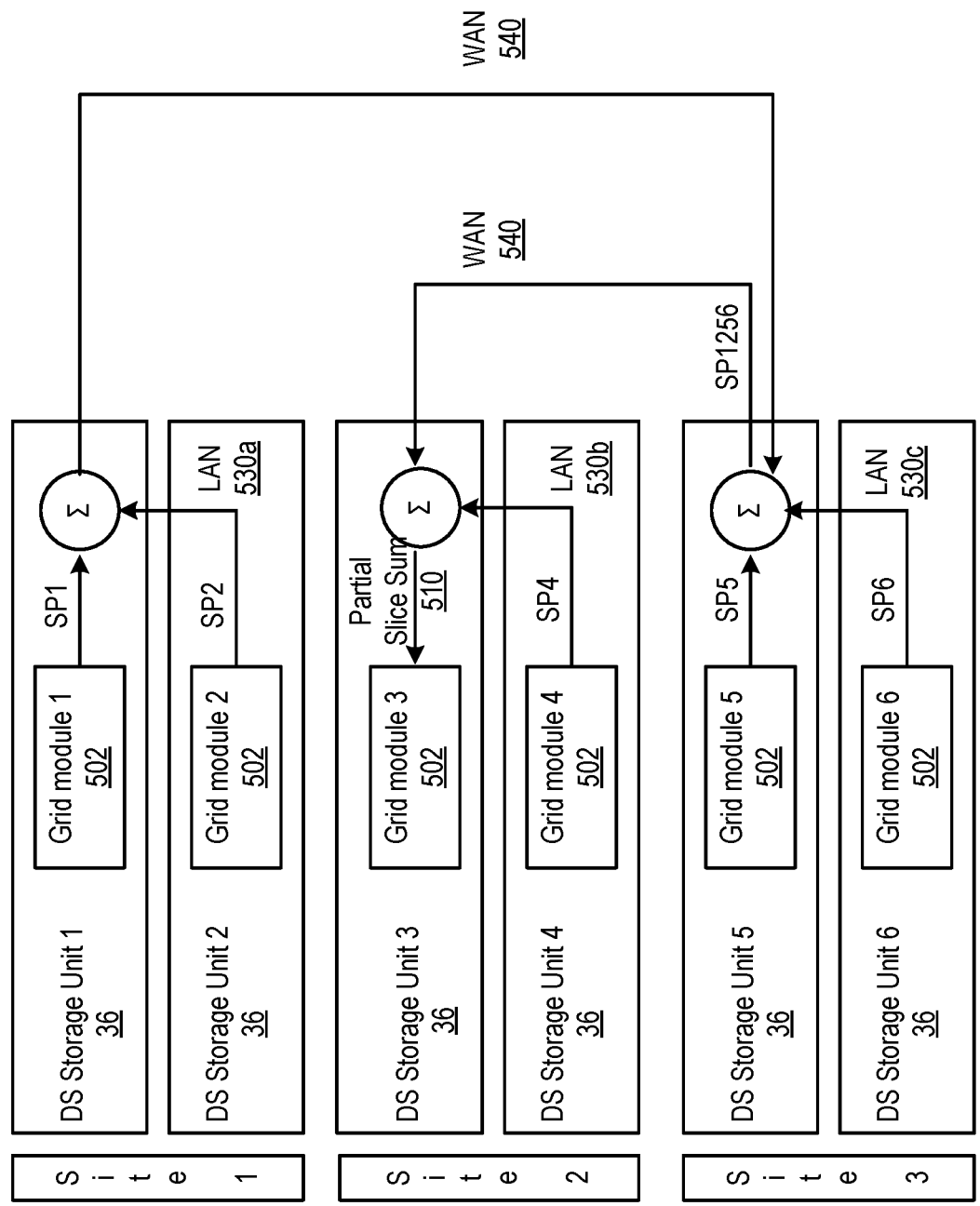
FIG. 27 is a schematic block diagram of another embodiment of data rebuilding in accordance with the invention.

FIG. 27 is a schematic block diagram of another embodiment of a dispersed storage system for partial rebuilding using ring sequencing. In the example, DS storage unit 1 receives slice partial SP2 from DS storage unit 2 over LAN 530a and combines slice partial SP2 with partial SP1 to produce summation SP12. DS storage unit 1 sends the first summation SP12 to DS storage unit 5. DS storage unit 5 receives slice partial SP6 from DS storage unit 6 over LAN 530c and combines slice partial SP6 with slice partial SP5 and summation SP12 to produce summation SP1256. DS storage unit 3 receives summation SP1256 from DS storage unit 5 and also receives slice partial SP4 over LAN 530b from DS storage unit 4. DS storage unit 3 combines summation SP1256 with slice partial SP4 to generate the rebuilt data slice.

When slice partials are combined at a site over a LAN 530, the partial rebuilding process requires less transmissions over the WAN 540 from the centralized rebuilding method. Though a ring sequence and a star sequence are described with respect to the partial rebuilding process, other sequences, such as a combination of a ring and star sequence, may also be implemented.

FIGS. 28 through 31 illustrate an embodiment for the partial rebuilding process. In the example in FIGS. 28-31, a missing encoded data slice from pillar 3 is rebuilt utilizing a star approach similar to the example in FIG. 26. In the example, a data segment is separated into a X pillars wherein X=6 and the threshold number T equals 4 pillars such that at least four data slices of the six data slices are needed to rebuild a missing slice. The example will illustrate utilizing a data slice from pillars 1, 2, 4, and 5 to reconstruct the missing pillar 3 data slice.

Figure 28:
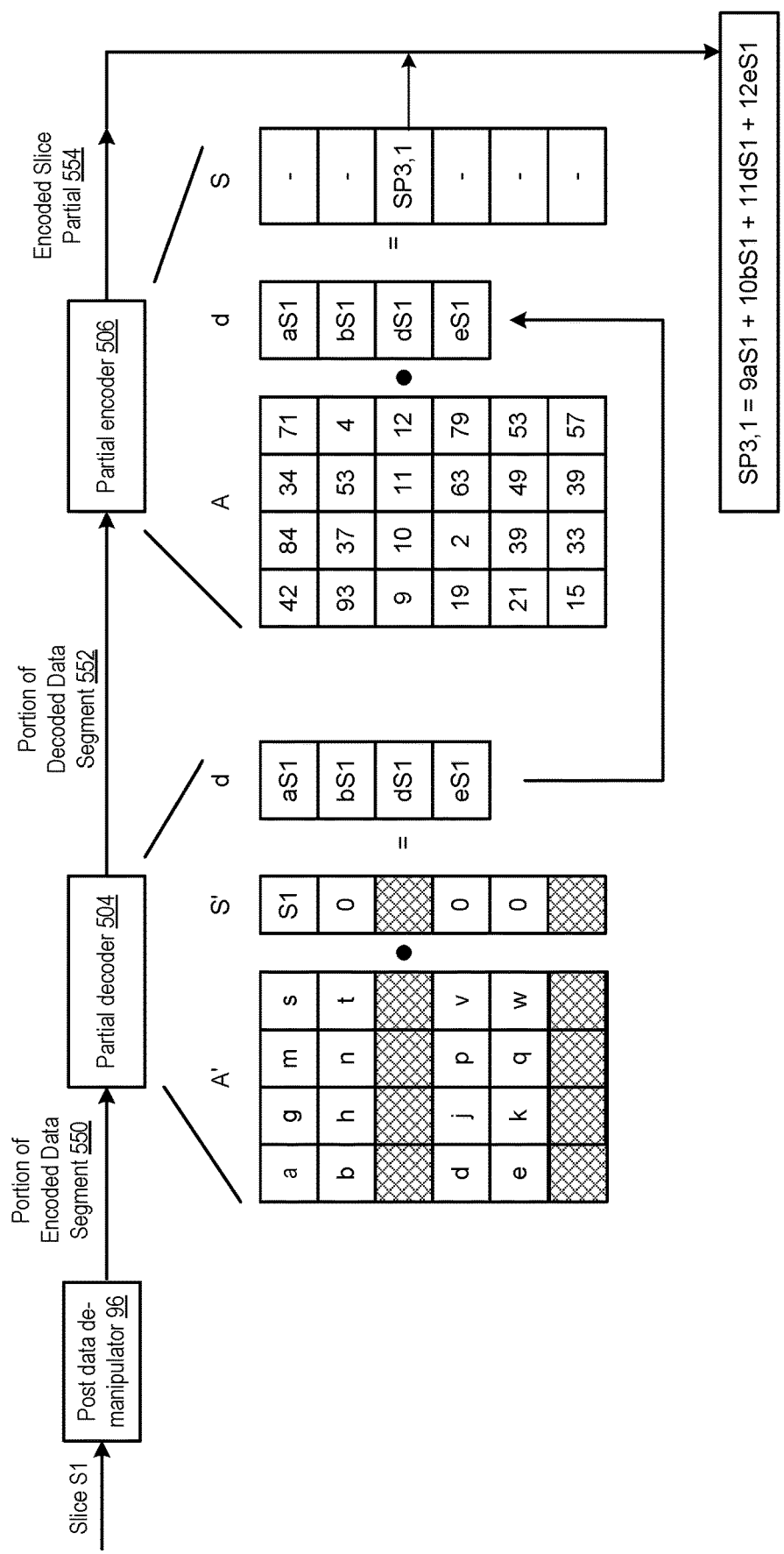
FIG. 28 is a schematic block diagram of another embodiment of data rebuilding in accordance with the invention.

FIG. 28 illustrates a schematic block diagram of an embodiment of the partial rebuilding process at DS storage unit 1. DS storage unit 1 receives a partial rebuild request that requests partial rebuilding of an identified data slice S3 with an associated error, e.g. the missing pillar 3 data slice. The rebuild request may identify the encoded data slice S1 stored at DS storage unit 1 from the same data segment and the identified data slice S3 with an associated error. The encoded data slice S1 is one of at least T required data slices needed to reconstruct the data segment. The post-data de-manipulator 96 performs any required data de-manipulation on the slice S1. In addition, in an embodiment, a deslicer 98 reorders the data bits, if necessary, to generate a portion of encoded data segment 550.

The partial rebuilding process includes generating a matrix A, matrix A' and matrix S' by the partial decoder 504 and partial encoder 506 in DS storage unit 1. Matrix A is generated by preferably first recreating approximately the same matrix used to derive the initial data slices from the data segment. For example, in an embodiment, matrix A is deterministically constructed using a special type of matrix called a Vandermond matrix. In a Vandermond matrix, each row is unique and linearly independent. Other types of matrices may also be used which have unique and linearly independent rows. The matrix A will have a number of rows equal to the number X of pillars and the number of columns equal to the threshold number T of required data slices needed to reconstruct the data segment. The X×T matrix A is thus generated to be approximately the same as the matrix used to derive the original data slices.

To generate A', certain rows are deleted from matrix A to generate a square matrix. For example, only a threshold number T of slices is needed to regenerate the data segment. So a number of rows equal to X-T are deleted to generate a square T×T matrix with T number of rows and T number of columns. In an embodiment, one of the X-T rows that are deleted includes the row corresponding to the missing slice. Once the T×T matrix is created, the inverse of this square matrix is calculated to generate the T×T matrix A'.

To generate vector S', the encoded data segment 550 is placed as a first element, corresponding to slice 1, to generate an X×1 vector. Then, the same rows deleted in matrix A to generate matrix A' are also deleted to generate a T×1 vector S'. In the example provided in FIGS. 28-31, the rows deleted in matrix A and vector S' are row 3 corresponding to the missing slice and the last row corresponding to slice 6. For graphical illustration, these rows 3 and 6 are shown as blank in matrix A' and vector S' in FIGS. 28-31. To more clearly show the calculations, symbolic letters are inserted into matrix A' rather than the calculated elements for the inverse matrix.

In the next step, the portion of the encoded data segment 550 is received by the partial decoder 504. The partial decoder 508 multiplies T×T matrix A' with T×1 vector S' to generate a portion of decoded data segment 552, vector d=aS1, bS1, dS1, eS1. The partial encoder 506 multiplies only a row of matrix A corresponding to the missing slice with vector d. In this example, row 3 corresponding to missing slice 3 of matrix A is multiplied with vector d to generate encoded slice partial 554 for missing pillar 3 from pillar 1, e.g. SP3,1=9aS1+10bS1+11dS1+12eS1.

Figure 29:
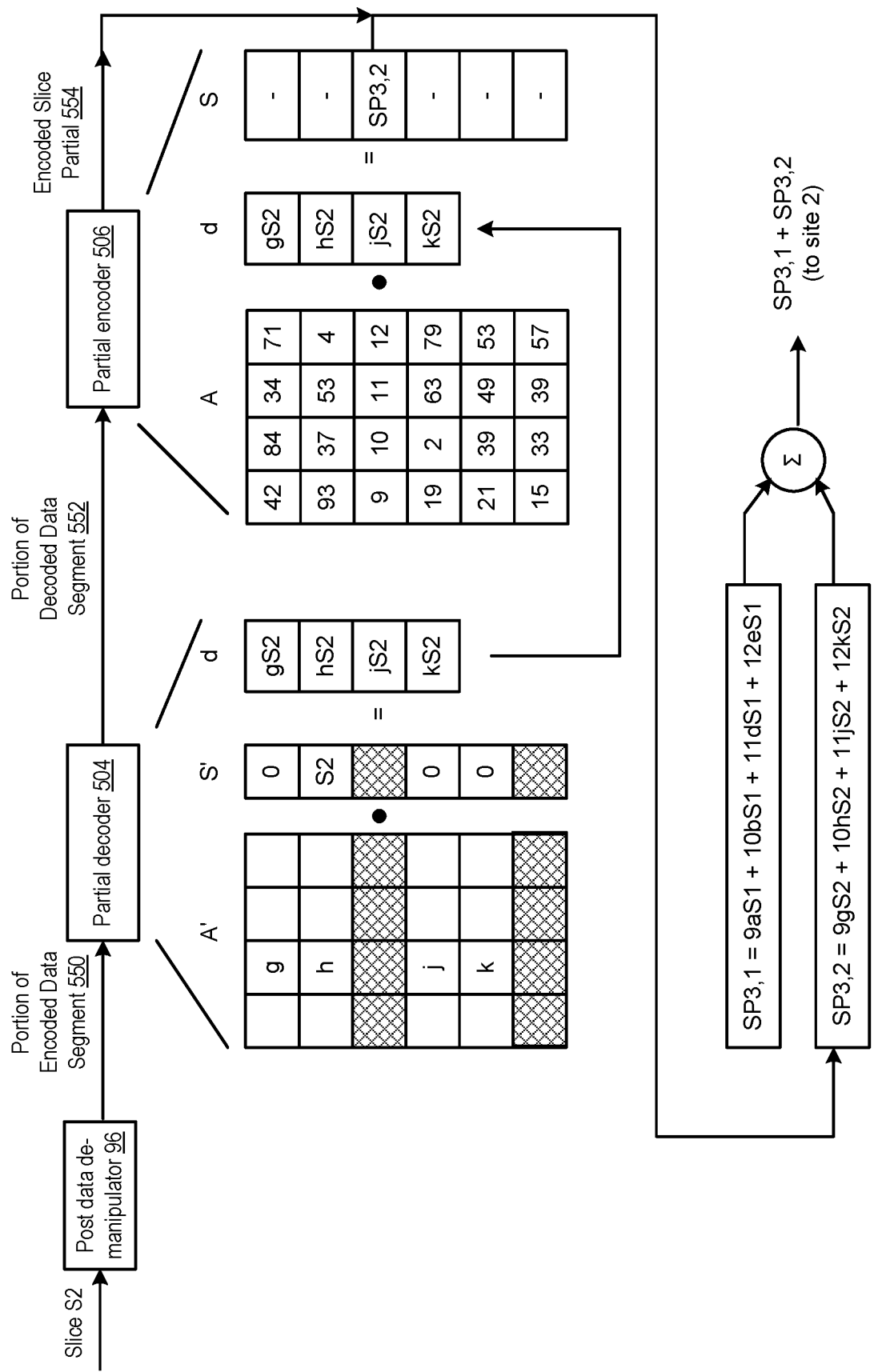
FIG. 29 is a schematic block diagram of another embodiment of data rebuilding in accordance with the invention.

FIG. 29 a schematic block diagram of an embodiment of the partial rebuilding process at DS storage unit 2. DS storage unit 2 generates an encoded slice partial SP3,2 from pillar 2, slice S2 which is one of at least the number T required data slices needed to reconstruct the data segment. DS storage unit 2 receives a partial rebuild request that requests partial rebuilding of an identified data slice S3 with an associated error, e.g. the missing pillar 3 data slice. The rebuild request may identify the encoded data slice S2 and the identified data slice S3 with an associated error. The post-data de-manipulator 96 performs any required data de-manipulation on the slice S2. In addition, in an embodiment, a deslicer 98 reorders the data bits, if necessary, to generate a portion of encoded data segment 550. The encoded data segment 550 is placed as a second element, corresponding to slice 2, in an X×1 vector and then row 3 corresponding to the missing slice and the last row corresponding to slice 6 are deleted to generate T×1 vector S'.

As explained above, matrix A and matrix A' are generated by the partial decoder 504 and partial encoder 506 in DS storage unit 2. The partial decoder 508 multiplies T×T matrix A' with T×1 vector S' to generate a portion of decoded data segment 552, vector d=gS2, hS2, jS2, kS2. The partial encoder 506 multiplies only a row of matrix A corresponding to the missing slice with vector d. In this example, row 3 corresponding to missing slice 3 of matrix A is multiplied with vector d to generate encoded slice partial 554 for missing pillar 3 from pillar 2, e.g. SP3,2=9gS2+10hS2+11jS2+12kS2.

In this example, one of the DS storage units at site 1, such as DS storage unit 1 or 2, combines SP3,1 and SP3,2 to generate the summation SP3,1+SP3,2. The DS storage unit then transmits the summation SP3,1+SP3,2 to site 2. In another embodiment, the slice partials can be combined with other slice partials in other sequences and orders until the threshold number T of slice partials have been summed to generate the rebuilt data slice.

Figure 30:
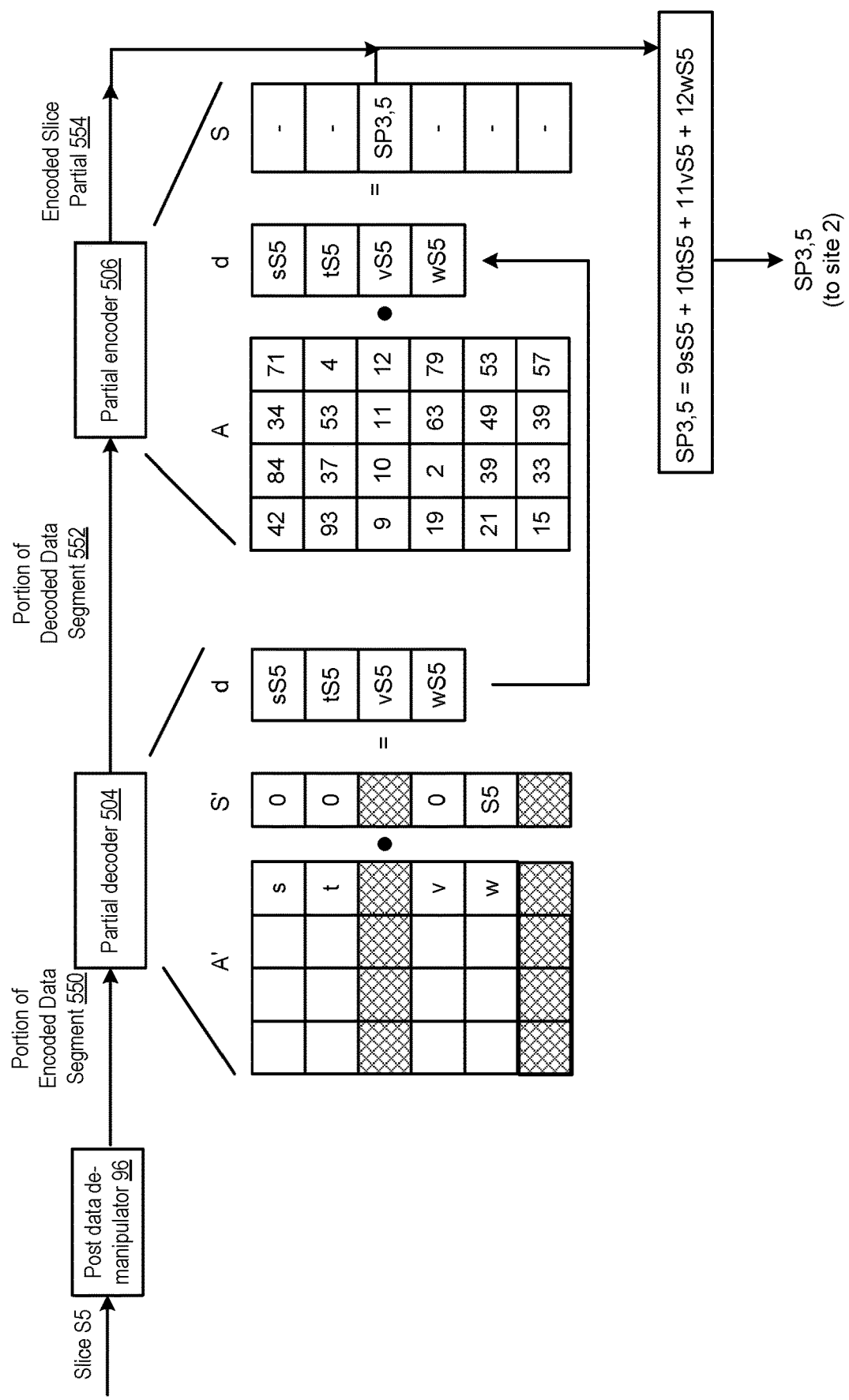
FIG. 30 is a schematic block diagram of another embodiment of data rebuilding in accordance with the invention.

FIG. 30 a schematic block diagram of an embodiment of the partial rebuilding process at DS storage unit 5. DS storage unit 5 generates an encoded slice partial SP3,5 from pillar 5, slice S5 which is one of at least the number T required data slices needed to reconstruct the data segment. DS storage unit 5 receives a partial rebuild request that requests partial rebuilding of an identified data slice S3 with an associated error, e.g. the missing pillar 3 data slice. The rebuild request may identify the encoded data slice S5 and the identified data slice S3 with an associated error. The post-data de-manipulator 96 performs any required data de-manipulation on the slice S5. In addition, in an embodiment, a deslicer 98 reorders the data bits, if necessary, to generate a portion of encoded data segment 550. The encoded data segment 550 is placed as a fifth element, corresponding to slice 5, in an X×1 vector and then row 3 corresponding to the missing slice and the last row corresponding to slice 6 are deleted to generate T×1 vector S'.

As explained above, matrix A and matrix A' are generated by the partial decoder 504 and partial encoder 506 in DS storage unit 5. The partial decoder 508 multiplies T×T matrix A' with T×1 vector S' to generate a portion of decoded data segment 552, vector d=sS5, tS5, vS5, wS5. The partial encoder 506 multiplies only a row of matrix A corresponding to the missing slice with vector d. In this example, row 3 corresponding to missing slice 3 of matrix A is multiplied with vector d to generate encoded slice partial 554 for missing pillar 3 from pillar 5, e.g. SP3,5=9sS5+10tS5+11vS5+12wS5. DS storage unit 5 transmits partial result SP3,5 to site 2.

Figure 31:
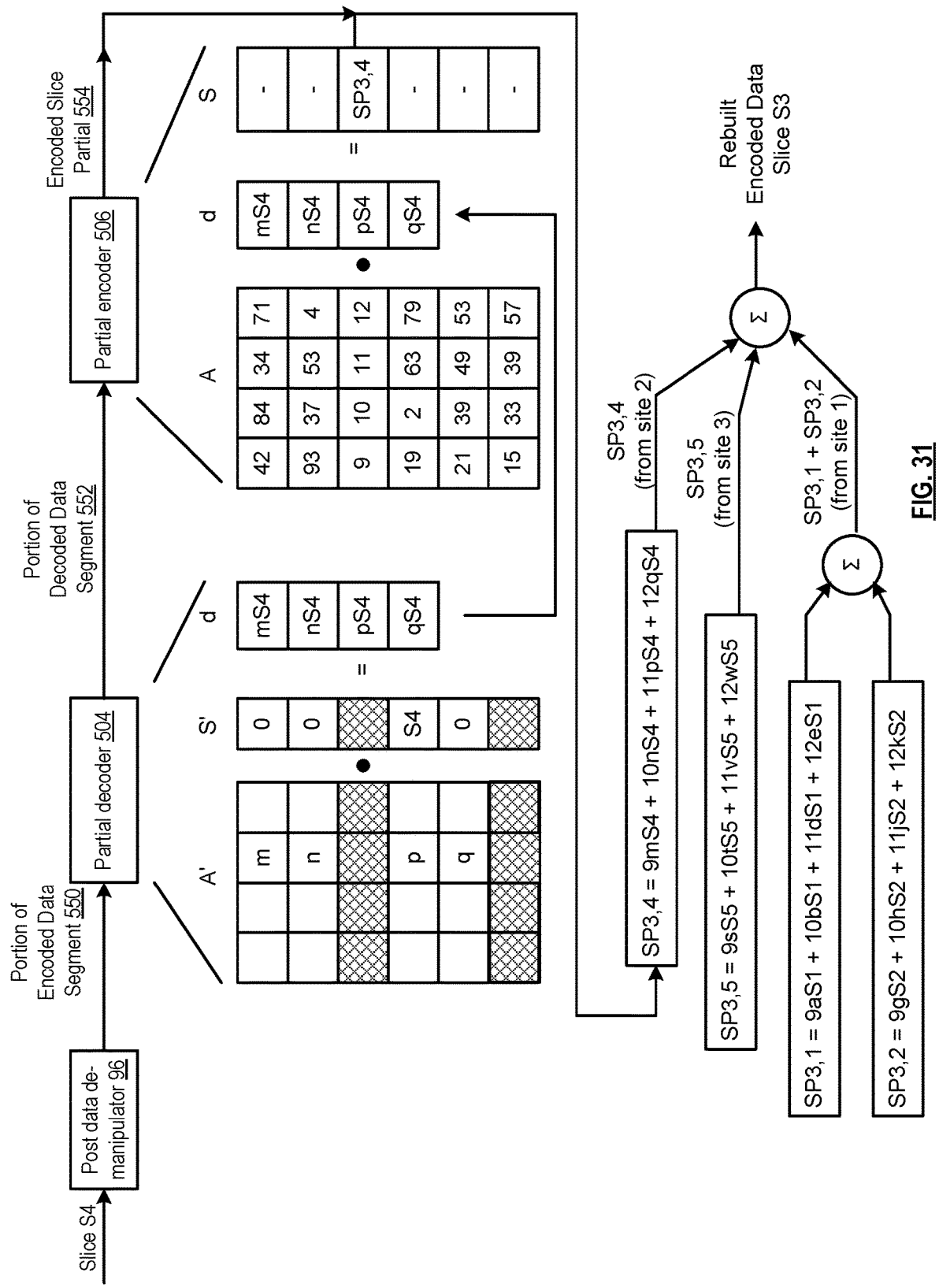
FIG. 31 is a schematic block diagram of another embodiment of data rebuilding in accordance with the invention.

FIG. 31 a schematic block diagram of an embodiment of the partial rebuilding process at DS storage unit 4. DS storage unit 4 generates an encoded slice partial SP3,4 from pillar 4, slice S4 which is one of at least the number T required data slices needed to reconstruct the data segment. DS storage unit 4 receives a partial rebuild request that requests partial rebuilding of an identified data slice S3 with an associated error, e.g. the missing pillar 3 data slice. The rebuild request may identify the encoded data slice S4 and the identified data slice S3 with an associated error. The post-data de-manipulator 96 performs any required data de-manipulation on the slice S4. In addition, in an embodiment, a deslicer 98 reorders the data bits, if necessary, to generate a portion of encoded data segment 550. The encoded data segment 550 is placed as a fourth element, corresponding to slice 4, in an X×1 vector and then row 3 corresponding to the missing slice and the last row corresponding to slice 6 are deleted to generate T×1 vector S'.

As explained above, matrix A and matrix A' are generated by the partial decoder 504 and partial encoder 506 in DS storage unit 5. The partial decoder 508 multiplies T×T matrix A' with T×1 vector S' to generate a portion of decoded data segment 552, vector d=mS4, nS4, pS4, qS4. The partial encoder 506 multiplies only a row of matrix A corresponding to the missing slice with vector d. In this example, row 3 corresponding to missing slice 3 of matrix A is multiplied with vector d to generate encoded slice partial 554 for missing pillar 3 from pillar 4, as SP3,4=9mS4+10nS4+11pS4+12qS4.

DS storage unit 3 receives the results and adds summation SP3,1+SP3,2 (from site 1) with slice partial SP3,5 (from site 3) with slice partial SP3,4 (from site 2) to generate the rebuilt slice S3 for pillar 3. DS storage unit 3 stores the rebuilt slice S3 in DS storage unit 3 or another available storage unit. When DS storage unit 3 is not available, another DS storage unit or storage integrity processing unit 20 may receive the results and generate the rebuilt slice S3 for pillar 3.

The example of the partial rebuilding process in FIGS. 28-31 requires two WAN transmissions (e.g., SP3,1+SP3,2 from site 1 and SP3,5 from site 3). A centralized rebuilding approach in this example would require four WAN transmissions to transmit four of the threshold number T of data slices from remote DS storage units to storage integrity processing unit 20 and then another WAN transmission to send the rebuilt data slice from the storage integrity processing unit 20 to the DS storage unit 36 for a total of five WAN transmission. As such, the partial rebuilding approach described herein decreases the number of WAN transmissions lowering the network bandwidth utilization compared to a centralized rebuilding approach.

Figure 32:
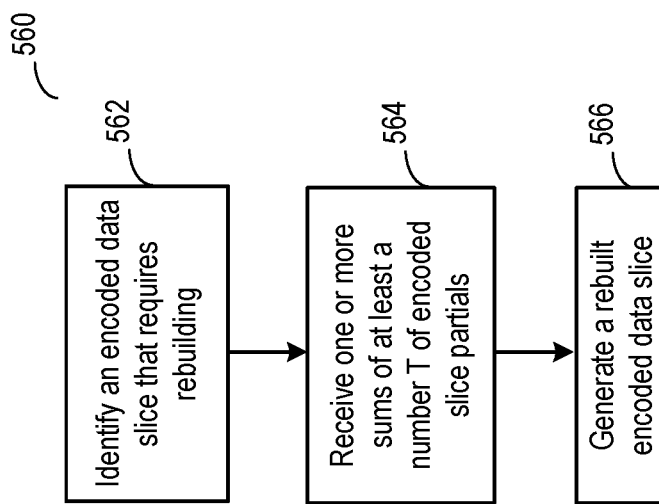
FIG. 32 is a schematic block diagram of another embodiment of data rebuilding in accordance with the invention.

FIG. 32 illustrates a logic flow diagram of an embodiment of a method 560 for a partial rebuilding. An encoded data slice is identified for rebuilding at a DS storage unit 36 in step 562. The identified data slice is one of X data slices generated from a data segment using an error encoding dispersal function. The DS storage unit 36 receives one or more sums of at least a threshold number T of encoded slice partials in step 564. The encoded slice partials are generated from a corresponding one of a plurality of the encoded data slices. The DS storage unit 36 then generates the rebuilt encoded data slice corresponding to the identified data slice from the one or more sums of at least the number T of encoded slice partials in step 566.

Figure 33:
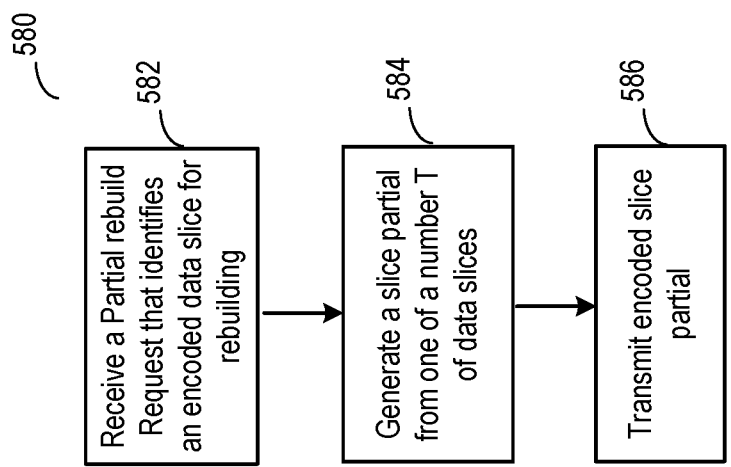
FIG. 33 is a logic flow diagram of another embodiment for data rebuilding in accordance with the present invention.

FIG. 33 illustrates a logic flow diagram of another embodiment of a method 580 for partial rebuilding. In step 582, a DS storage unit 36 receives a partial rebuild request from another DS storage unit 36 or in another embodiment from storage integrity processing unit 20 or DS managing unit 18 or user device 12, 14 that includes for example, an identification of an identified data slice for rebuilding. The request may also include an identification of an encoded data slice stored at the DS storage unit 36 from the same data segment, wherein the encoded data slice is one of a threshold number T of data slices required to reconstruct the data segment. The DS storage unit 36 generates a slice partial from the one of a threshold number T of data slices required to reconstruct the data segment in step 584. The DS storage unit 36 then transmits the slice partial to the requesting unit or other identified destination in step 586.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" indicates that an item includes one or more of power connections, input(s), output(s), etc., to perform one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. A method for execution by one or more processing modules of a storage network (SN), the method comprises:
   scanning a storage node of the SN at a predetermined interval to determine whether an erasure encoded data slice (EEDS) of a set of erasure encoded data slices (EEDSs) is corrupt, wherein the set of EEDS is generated from object data using an erasure error encoding dispersal function, wherein at least some EEDSs of the set of EEDSs are stored in the storage node; and
   in response to a determination that the EEDS is corrupt, rebuilding the EEDS in place in the storage node.

2. The method of claim 1, wherein the rebuilding the EEDS comprises:
    retrieving a plurality of EEDSs of the set of EEDSs;
    using the plurality of EEDSs to rebuild the EEDS.

3. The method of claim 1, wherein the object data is a data segment of a set of data segments, wherein the set of data segments is produced from a data object.

4. The method of claim 3, wherein the data segment is the set of EEDSs.

5. The method of claim 1, wherein the object data is a data object.

6. The method of claim 1, wherein the scanning a storage node of the SN further comprises:
    scanning each EEDS of the set of EEDS stored in one or more storage units (SUs) of the SN.

7. The method of claim 1, wherein the scanning a storage node of the SN further comprises:
    using a plurality of scanning agents, wherein each scanning agent of the plurality of scanning agents is associated with at least a portion of a storage space of the storage node.

8. The method of claim 7, wherein the storage space is associated with a storage address range.

9. The method of claim 1, wherein the predetermined interval is a periodic interval.

10. The method of claim 9, wherein the periodic interval is a previously determined period of time.

11. The method of claim 1, wherein the rebuilding the EEDS comprises:
    waiting a predetermined time period;
    after the predetermined time period, determining whether the EEDS is still corrupt; and
    when the EEDS is still corrupt after the predetermined time period, rebuilding the EEDS.

12. The method of claim 1, wherein the rebuilding the EEDS comprises:
    determining a number E EEDSs of the set of EEDSs with an associated error;
    when the number E EEDSs of the set of EEDSs with an associated error compares unfavorably to a threshold, rebuilding the EEDS; and
    when the number E EEDSs of the set of EEDSs with an associated error compares favorably to the threshold, waiting a predetermined time period before rebuilding the EEDS.

13. The method of claim 12, wherein the threshold equals a number X EEDSs of the set of EEDSs less a number T of the set of EEDSs needed to reconstruct the object data based on the erasure error encoding dispersal function.

14. The method of claim 1, wherein the rebuilding the corrupt EEDS comprises:
    retrieving at least a number T EEDSs of the set of EEDSs, wherein the number T corresponds to a number of the set of EEDSs needed to reconstruct the object data based on the erasure error encoding dispersal function;
    reconstructing the object data from at least the number T of the set of EEDSs to produce reconstructed object data; and
    generating a second set of EEDSs from the reconstructed object data based on the erasure error encoding dispersal function, wherein the second set of EEDSs includes a rebuilt EEDS corresponding to the EEDS.

15. The method of claim 1, wherein the scanning a storage node of the SN includes:
    scanning an address range of EEDSs stored in one or more memory devices associated with the storage node, wherein each EEDS of the set of EEDSs is associated with an address within the address range; and
    determining whether one or more of the EEDSs within the address range is corrupt.

16. The method of claim 1, wherein the scanning a storage node of the SN includes scanning the set of EEDSs, wherein the set of EEDSs is stored in one or more storage units; and
    determining whether an EEDS of the set of EEDSs is corrupt.

17. A verification system in a storage network (SN), comprising:
    at least one network interface to the SN; and
    at least one processing module that is operable to:
        scan a storage node of the SN to determine whether an erasure encoded data slice (EEDS) of a set of erasure encoded data slices (EEDSs) is corrupt, wherein the set of EEDS is generated from object data using an erasure error encoding dispersal function;
        identify an EEDS that is corrupt; and
        rebuild the EEDS based on other EEDSs of the set of EEDSs stored on the storage node.

18. The system of claim 17, wherein the at least one processing module is further operable to:
    scan the storage node in response to a scan request.

19. The system of claim 17, wherein the at least one processing module is further operable to:
    scan the storage node on a predetermined interval.

20. The system of claim 19, wherein the at least one processing module is located in the storage node.

* * * * *